United States Patent [19]
Pollard

[11] Patent Number: 5,627,761
[45] Date of Patent: May 6, 1997

[54] INTERNAL ALIGNMENT OF ROTATING AND STATIONARY COMPONENTS WITHIN A STEAM OR GAS TURBINE

[75] Inventor: Michael A. Pollard, Cary, N.C.

[73] Assignee: Carolina Power & Light Company, Raleigh, N.C.

[21] Appl. No.: 316,568

[22] Filed: Sep. 30, 1994

[51] Int. Cl.[6] .................................................... G01B 7/14
[52] U.S. Cl. .............................. 364/506; 33/504; 33/543; 324/207.22
[58] Field of Search ..................................... 364/506, 550, 364/560, 561, 562; 324/207.11, 207.18, 207.22, 207.23; 33/504, 505, 520, 542, 543, 544.1

[56] References Cited

U.S. PATENT DOCUMENTS

| | | | |
|---|---|---|---|
| 3,470,460 | 9/1969 | Panofsky et al. | |
| 3,905,116 | 9/1975 | Roberts | 33/555 |
| 4,196,523 | 4/1980 | Nagata et al. | 33/504 |
| 4,241,509 | 12/1980 | Possati | 33/505 |
| 4,377,947 | 3/1983 | Matsushita et al. | 73/593 |
| 4,596,952 | 6/1986 | Goff et al. | 324/207.25 |
| 4,644,270 | 2/1987 | Oates et al. | 324/207.25 |
| 4,659,988 | 4/1987 | Goff et al. | 324/207.25 |
| 4,987,555 | 1/1991 | Twerdochlib | 364/561 |

OTHER PUBLICATIONS

"Align and Level Turbine/Generators", Power vol. 119, No. 8, Aug. 1975.

*Primary Examiner*—Edward R. Cosimano
*Assistant Examiner*—Edward Pipala
*Attorney, Agent, or Firm*—Richard S. Faust

[57] ABSTRACT

An automated data taking and analysis system is used during maintenance overhaul of steam or gas turbines to determine the required position of internal flowpath parts so that the parts may be properly reassembled with appropriate spacing to prevent internal rubbing and resultant wear or damage to the turbine that may affect unit operation or performance. Data is taken by electronic position transducers mounted on a rotatable tube, with the transducers being installed at selected axial locations along the tube where setpoint hard bores and seals reside on flowpath components. The transducers include radially projecting surface-riding portions for contacting the cylindrical flowpath component hard bore or seal. For use with large utility or industrial turbines, the transducers have a linear range greater than 0.80 inch to accommodate relatively large amounts of component ellipticity, tube sag, component misalignment and/or variation. The system includes a programmed laptop computer that receives data from the transducers by a serial chain with appropriate communications electronics. The operation of the invention involves creation of a computer model for the tube and the respective hard bore and seal locations where measurements are taken; automatic input of data generated by top off, top on/top off, ellipticity and joint offset measurements; generation of intermediate output reports for position output, variation output, vertical position and horizontal position; and, ultimately, generation of a required move report describing the roll or non-roll move required at each hard bore or seal location.

25 Claims, 52 Drawing Sheets

| FIG. 1A | FIG. 1B |

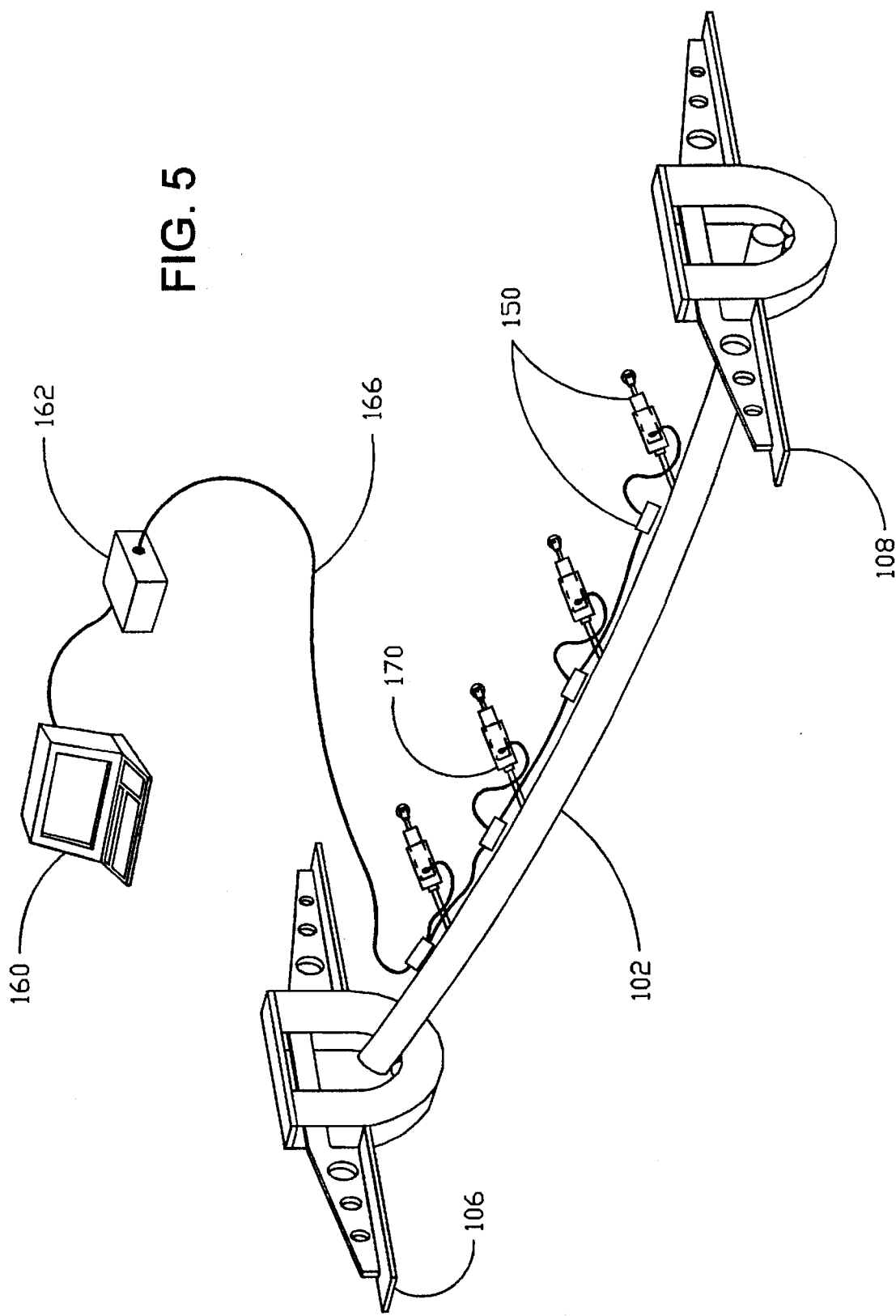

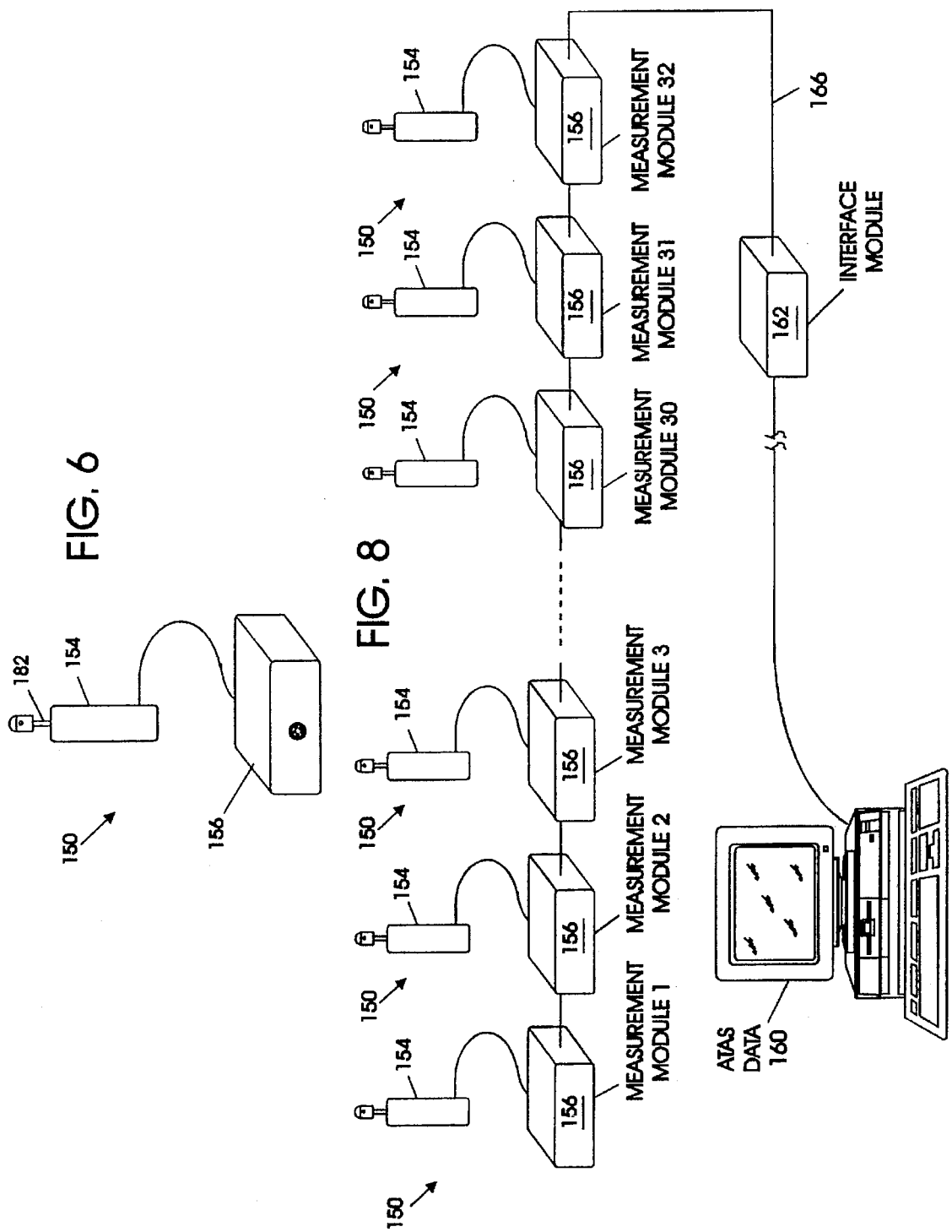

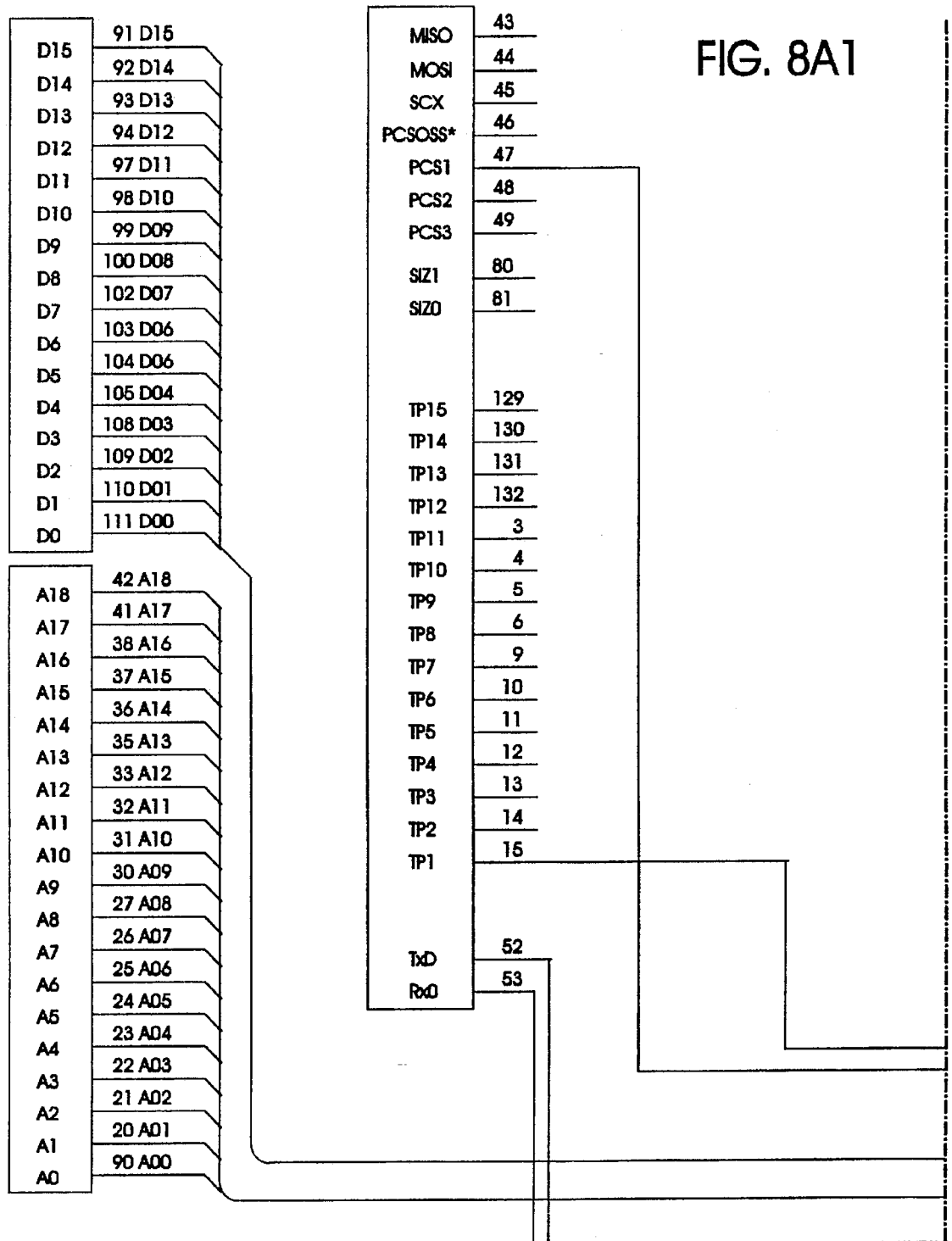
FIG. 8A1

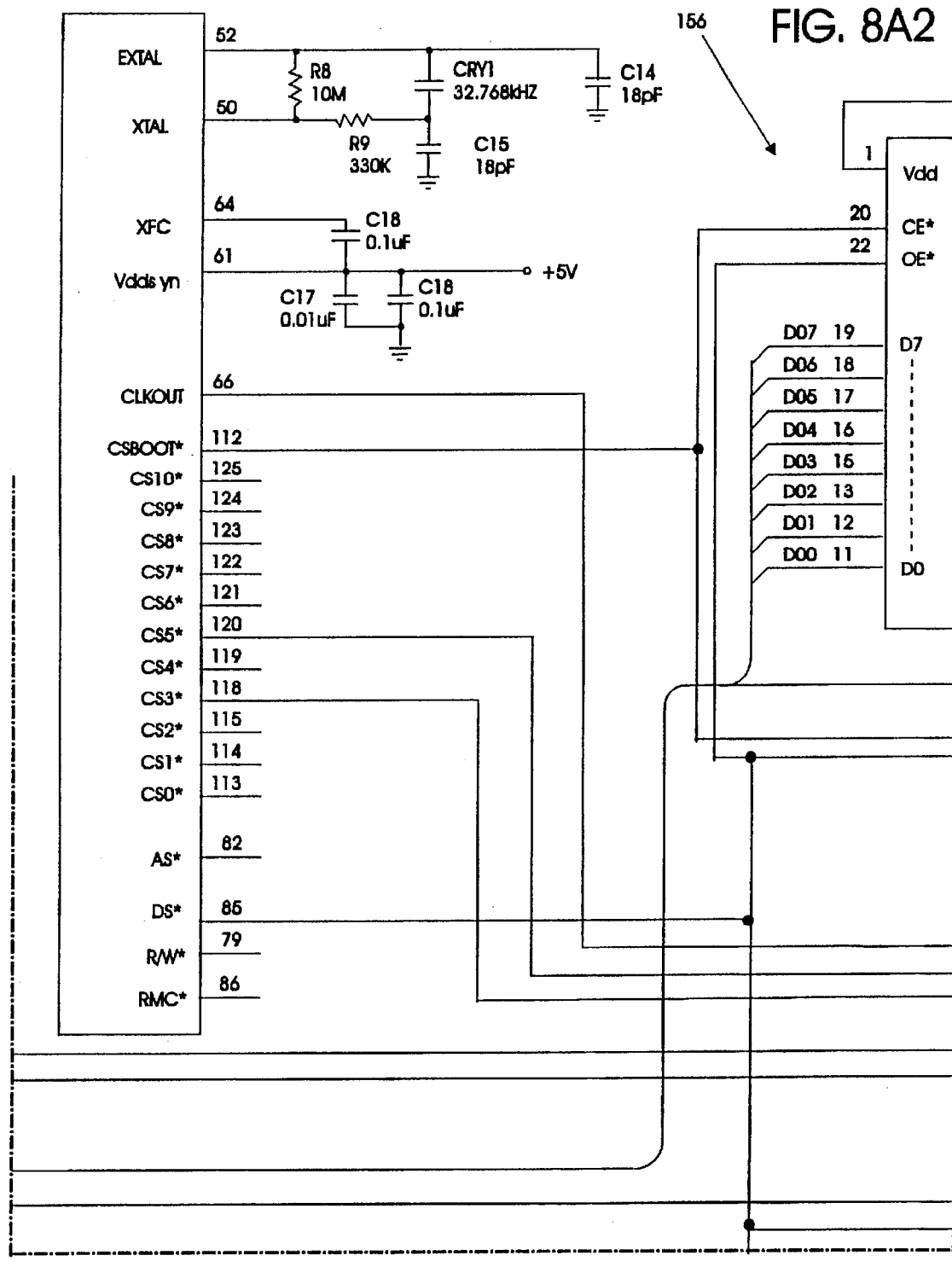
FIG. 8A2

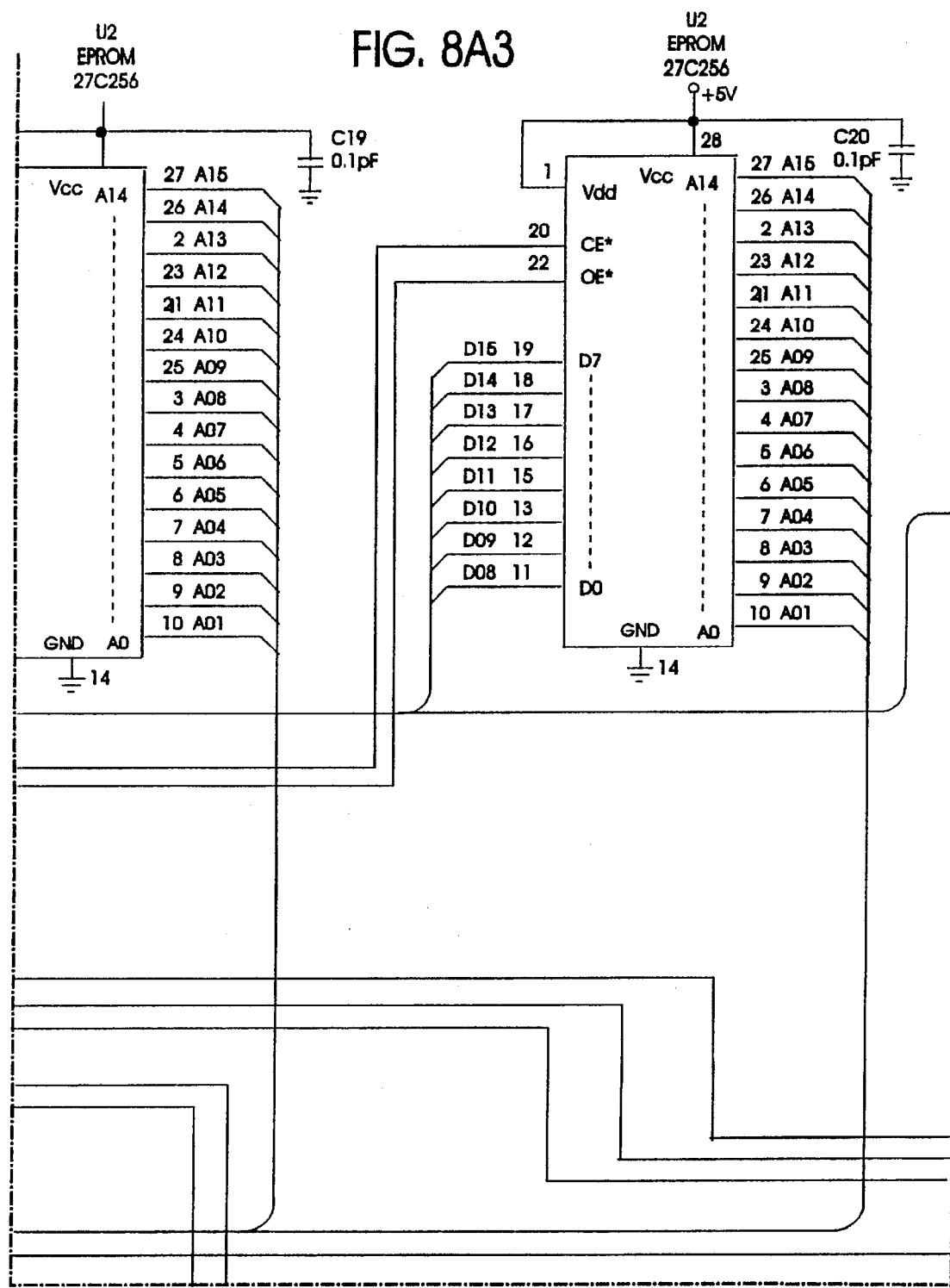
FIG. 8A3

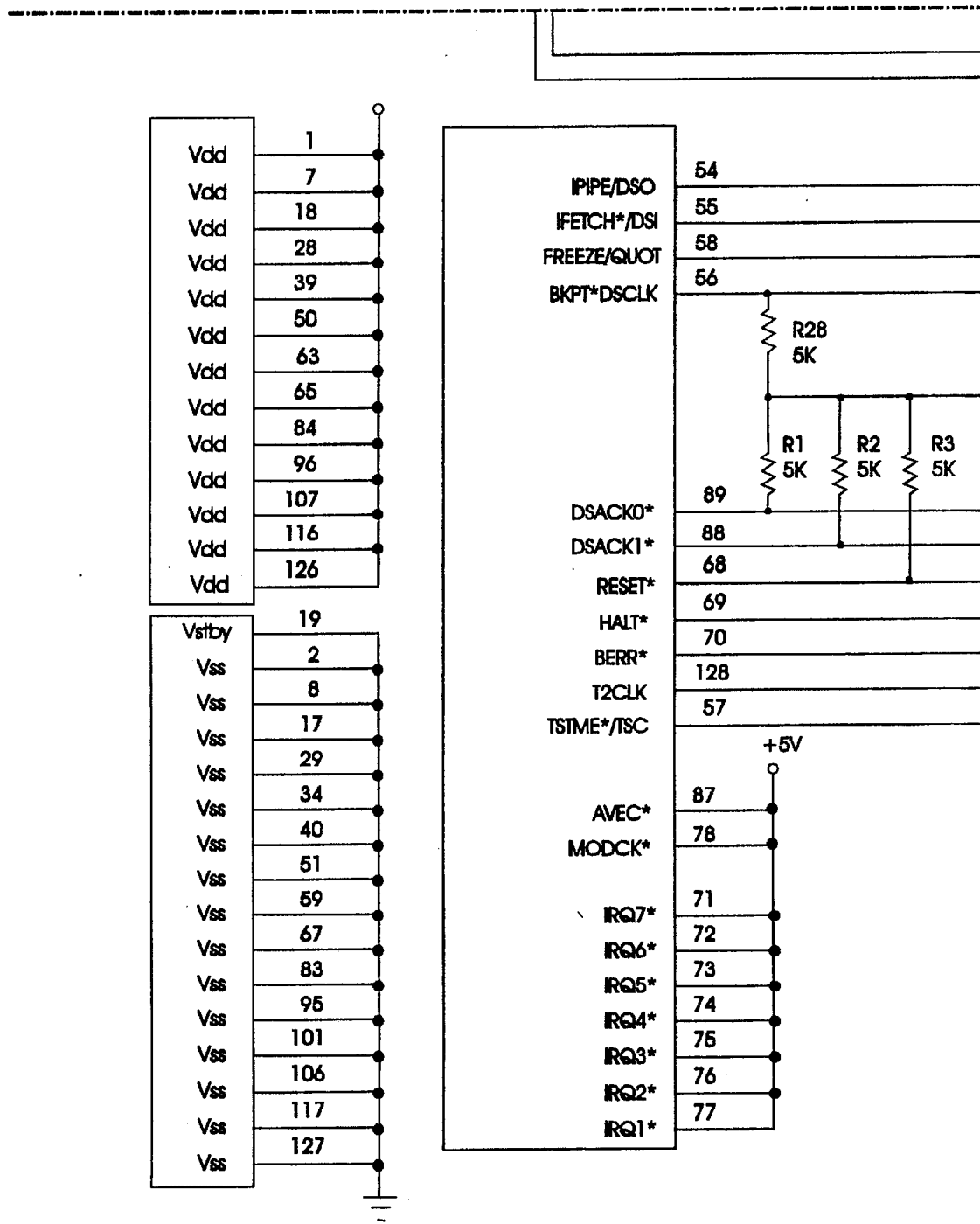
FIG. 8A4

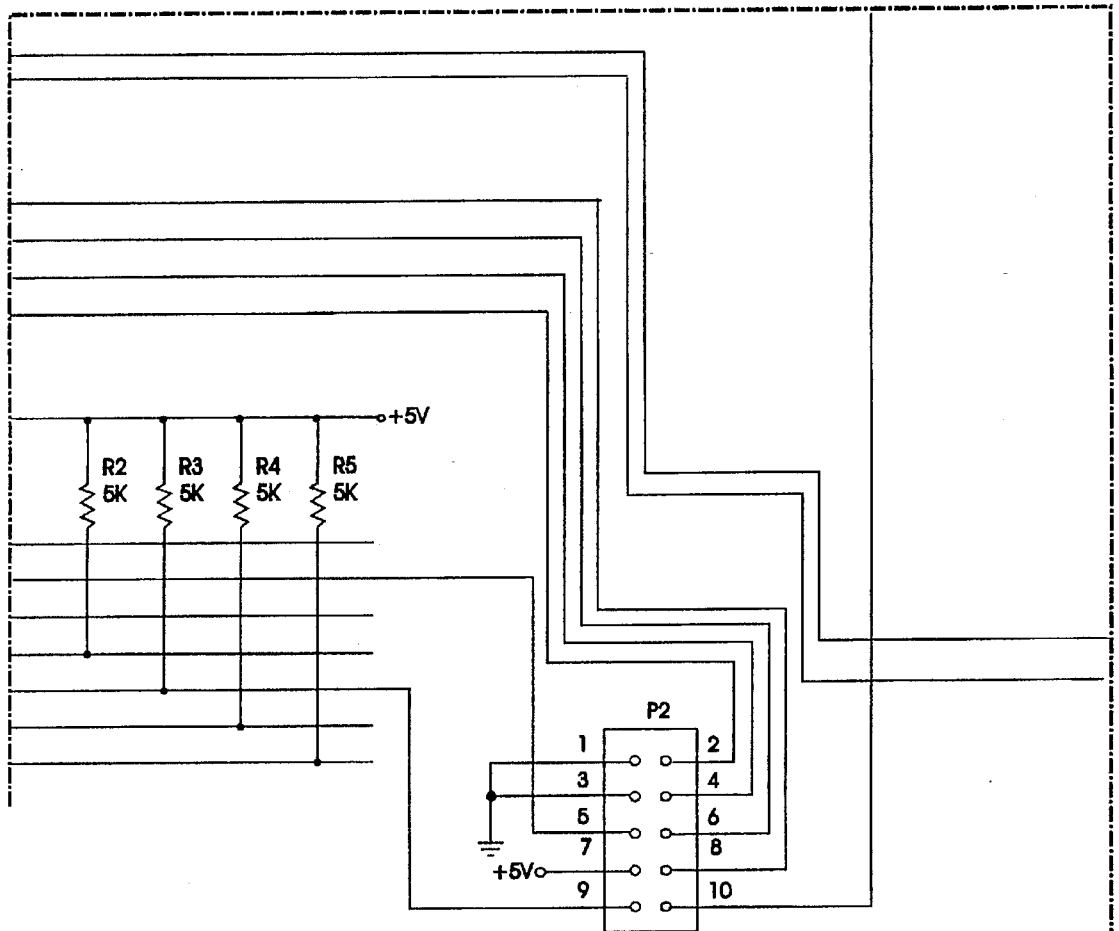
FIG. 8A5
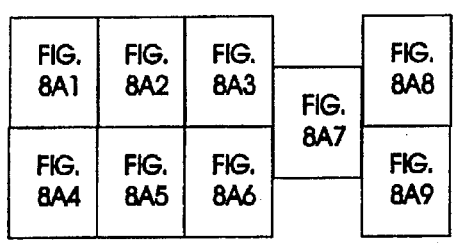
FIG. 8A

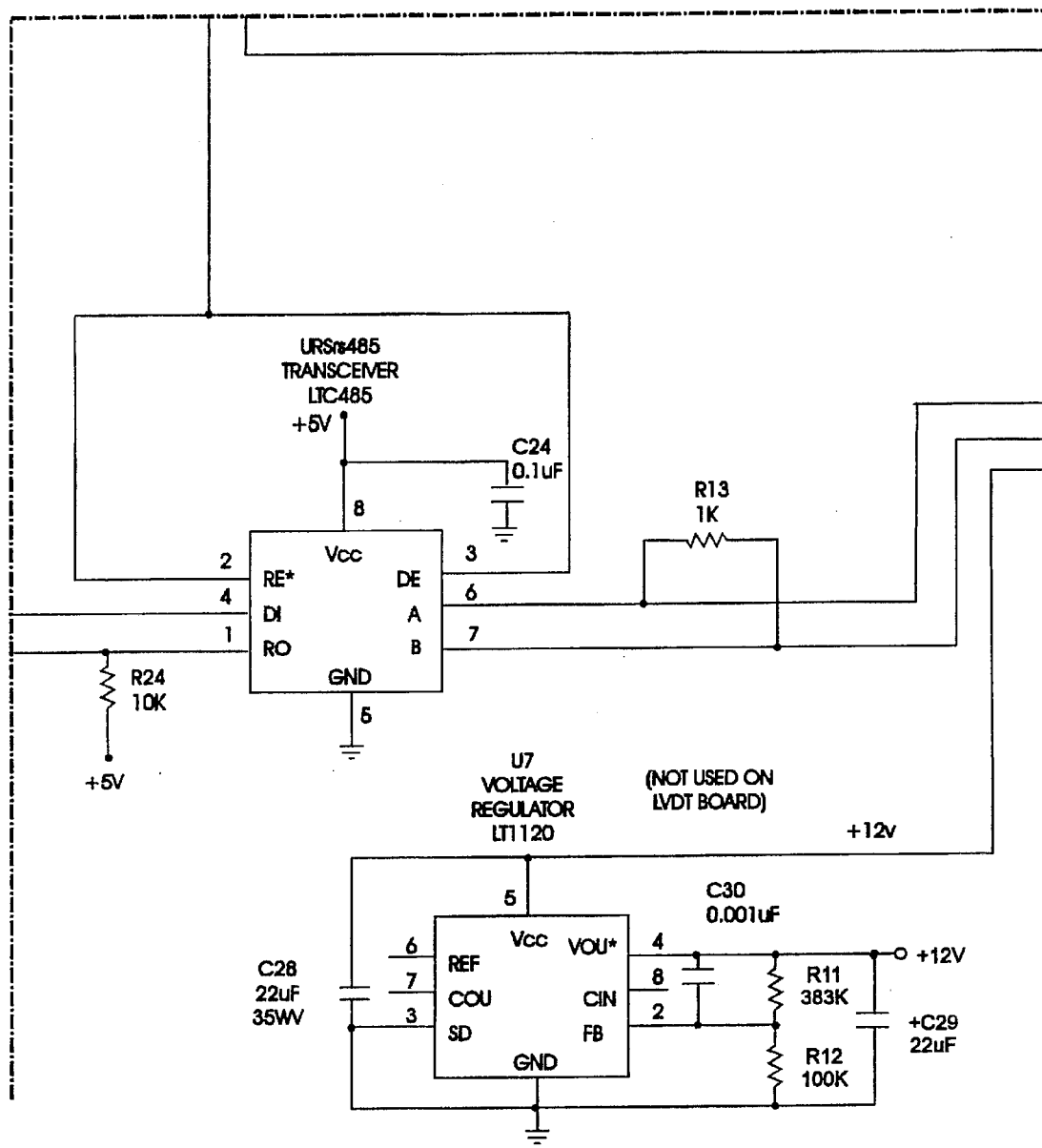
FIG. 8A6

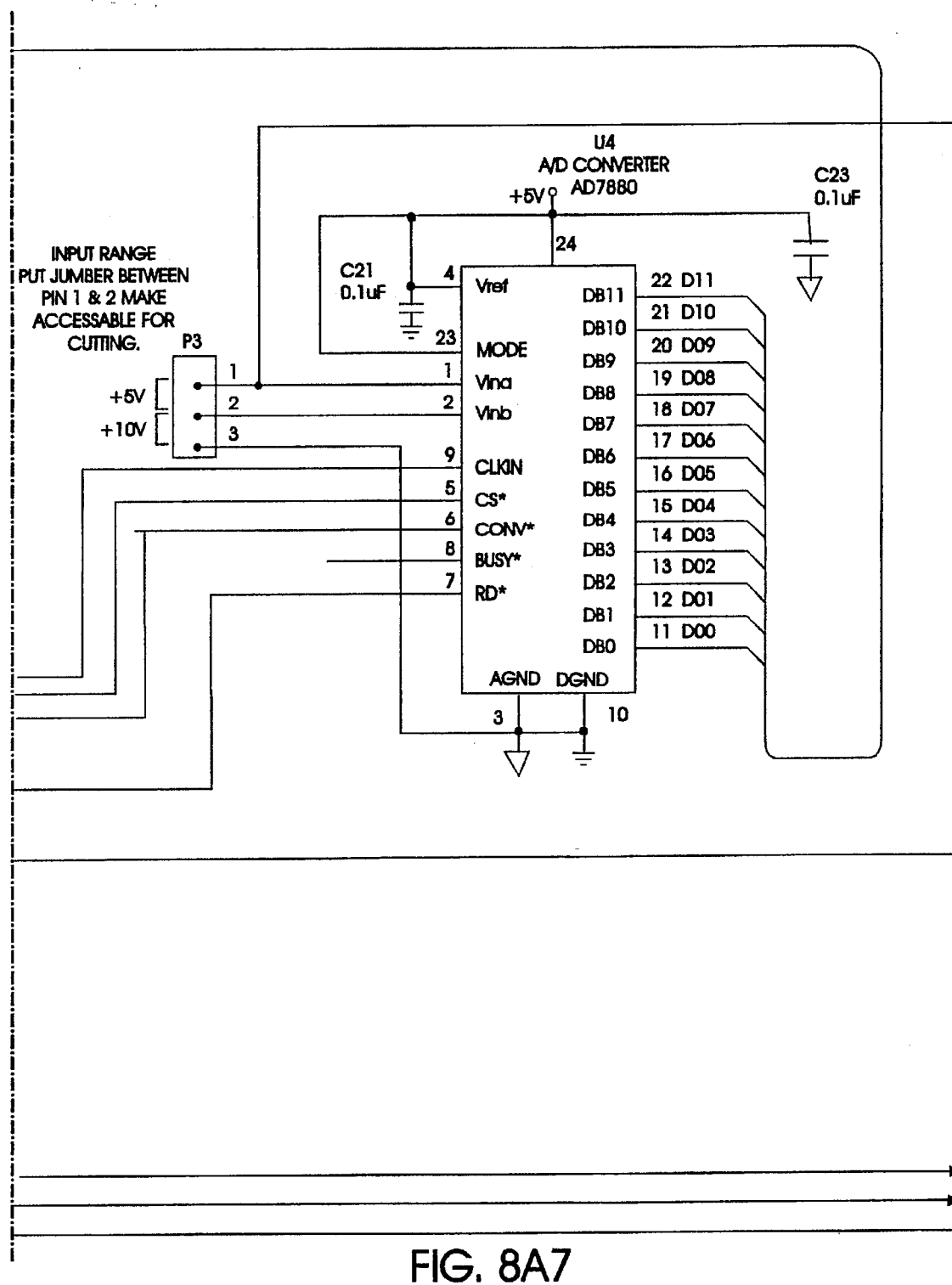
FIG. 8A7

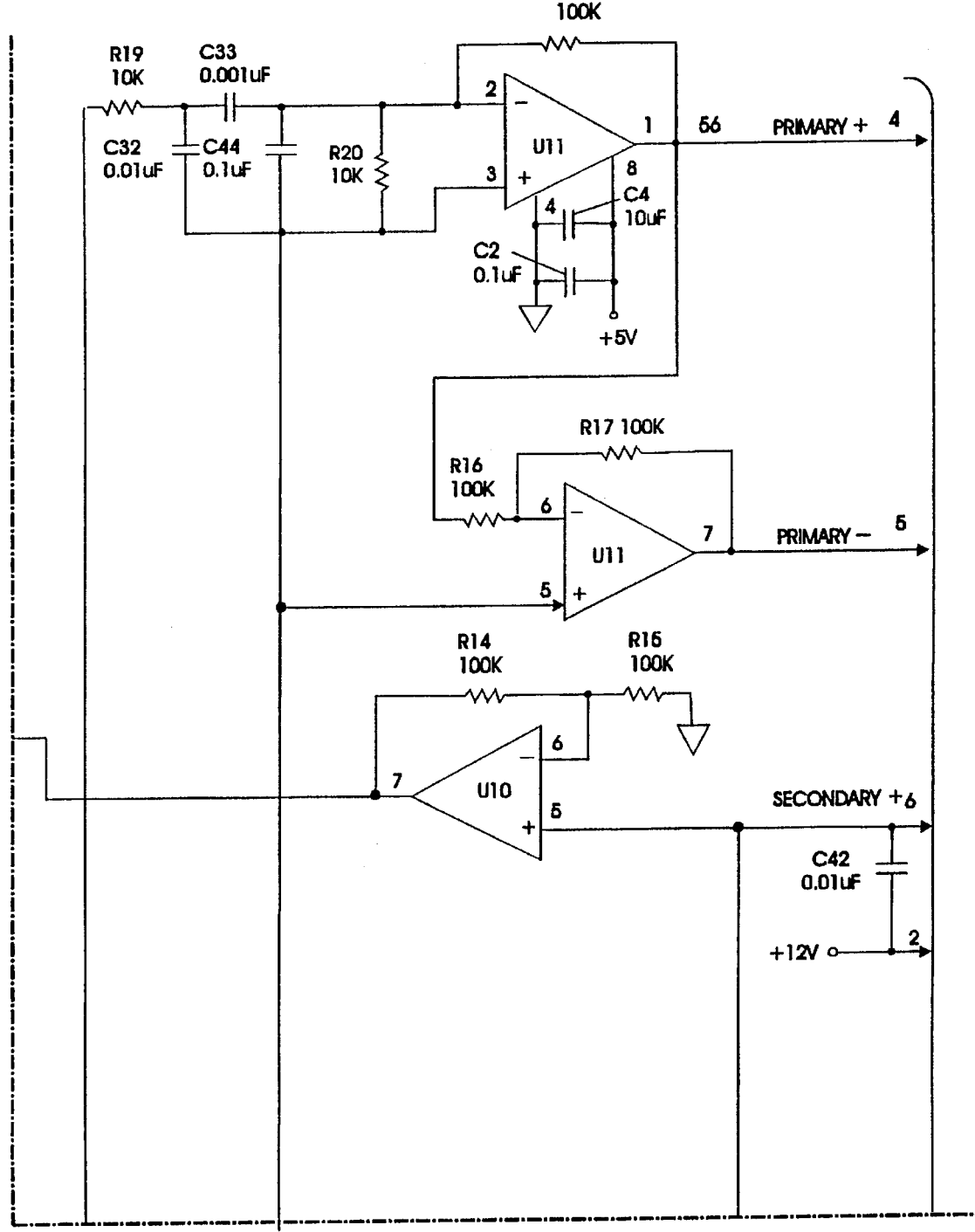
FIG. 8A8

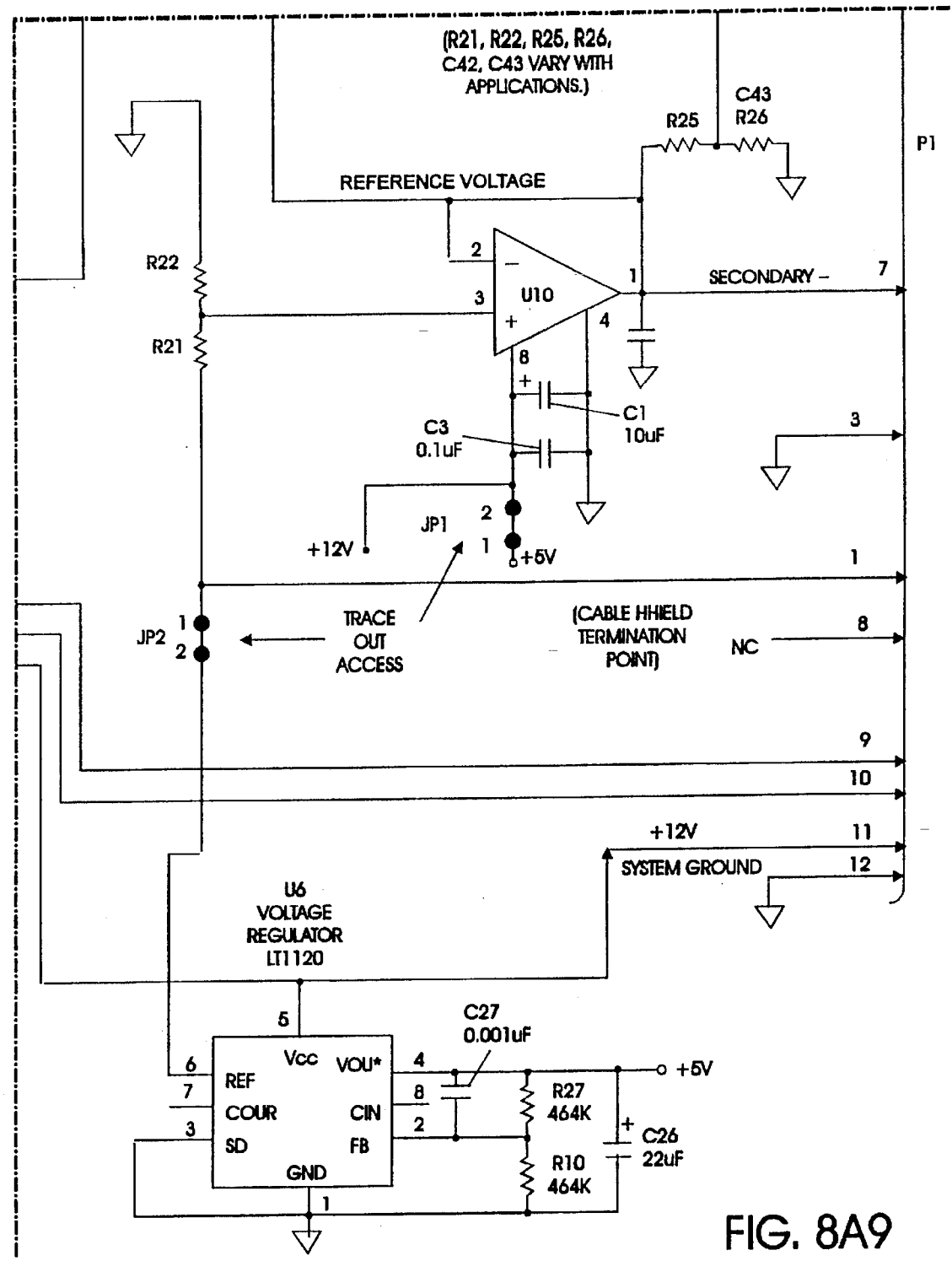
FIG. 8A9

FIG. 10

| System | File | Collect/View | Report | Function Keys | Cursor Control |

Generic Bore Report

File Name: HPIP1　　　No. of Bores: 25　　　Section: HPIP
Plant:　　　　　　　　Unit No: 5　　　　　　Date:
Engineer:　　　　　　Crew: NA
Weather:　　RAINY, COOL
Commnts:

Mechanical / Deflection Data

Length: 240.00 in　　　　　　　　Weight: 2.5250 lb/in

Tube

Youngs Mod: 29.0 *10^6 psi　　　Inertia: 49.5000 in^4

| TURBINE SETPOINT DATA | | | | GENERATOR SETPOINT DATA | | | |
|---|---|---|---|---|---|---|---|
| Bore Number | Zero Reference Data | | | Bore Number | Zero Reference Data | | |
| | Left | Bottom | Right | | Left | Bottom | Right |
| 2 | 0.0 | 10.0 | 0.0 | 16 | 0.0 | 10.0 | 0.0 |

Generic Bore Information

| Bore Number | Description | Distance From GE Support | Transducer Wt(oz.) | Roll/ No Roll (T/F) | Bore Dependent Upon | | | |
|---|---|---|---|---|---|---|---|---|
| | | | | | Pair #1 | Pair #2 | Pair #3 | Pair #4 |
| 1 | T2-OB | 42.00 | 26.30 | F | 0 0 | 0 0 | 0 0 | 0 0 |
| 2 | T2-SSB | 53.25 | 27.50 | F | 0 0 | 0 0 | 0 0 | 0 0 |
| 3 | IP#4 BR,GE | 65.50 | 77.70 | F | 0 0 | 0 0 | 0 0 | 0 0 |

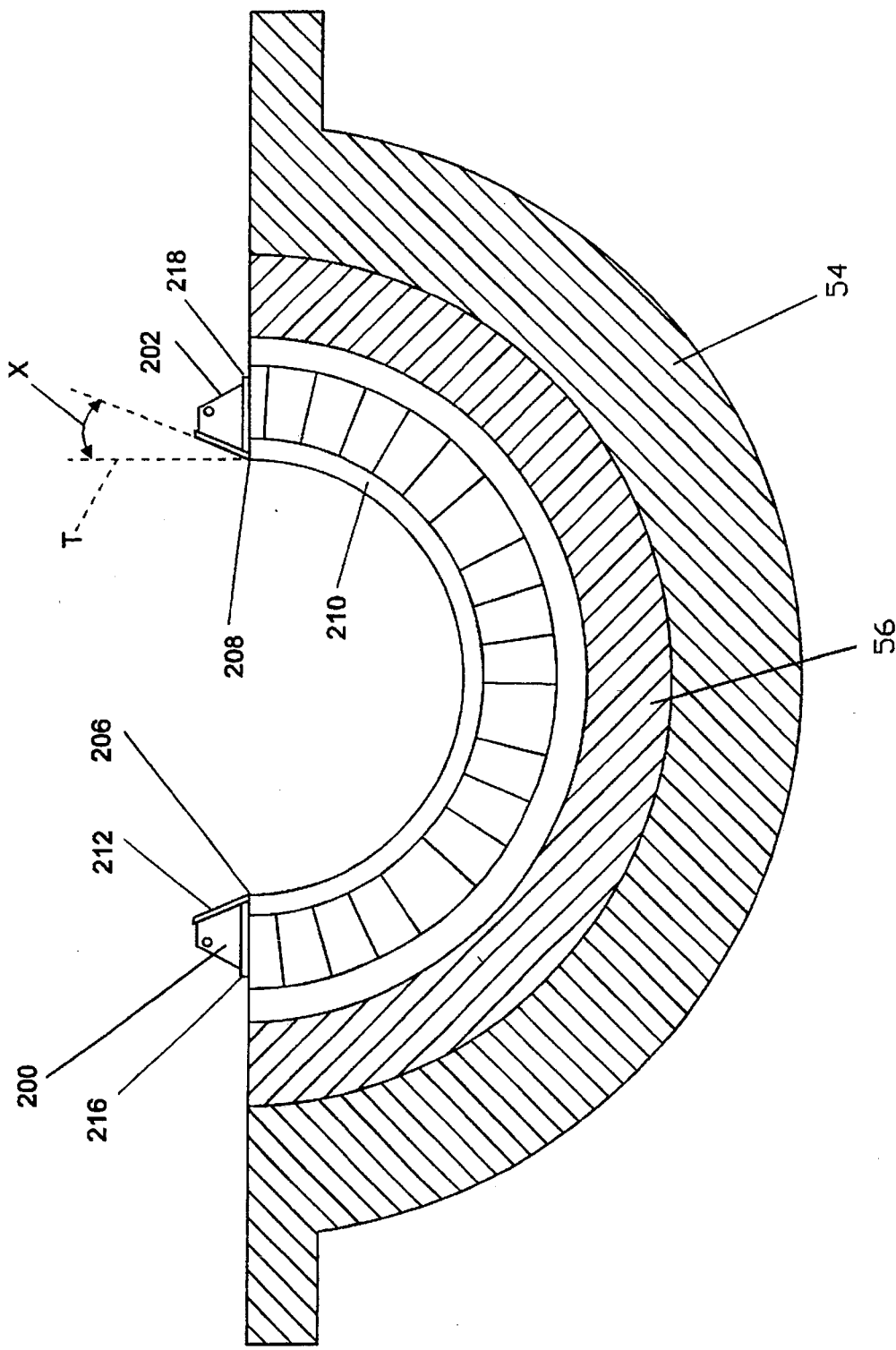

FIG. 14

Calibration - Top Off

Date:

| File: HPIP2 | Plant: | Unit: 5 | Section: HP/IP |

| Channel | Activate Bore | Bore No. | Bore Description | Transducer ID Number | Calibration Data Extended | Calibration Data Retract |
|---|---|---|---|---|---|---|
| 1 | [ ] | 6 | #4 IP BR TE | 0 | 0 | 0 |
| 1 | [X] | 7 | #3 IP BR GE | 74 | 11520 | 20636 |
| 1 | [X] | 8 | #3 IP BR TE | 73 | 11904 | 20682 |
| 1 | [X] | 9 | IPIC 19th Stg | 8 | 10486 | 21222 |
| 1 | [X] | 10 | IPIC 13th Stg | 72 | 11893 | 20560 |
| 1 | [X] | 11 | IP DUMMY | 71 | 11449 | 20412 |

Menu: System  File  Collect/View  Report  Function Keys  Cursor Control

FIG. 16

| Channel | Activate Bore | Bore No. | Bore Description | Transducer ID Number | Calibration Data | |
|---|---|---|---|---|---|---|
| | | | | | Extended | Retract |
| 1 | [ ] | 6 | #4 IP BR TE | 0 | 0 | 0 |
| 1 | [X] | 7 | #3 IP BR GE | 74 | 11520 | 20636 |
| 1 | [X] | 8 | #3 IP BR TE | 73 | 11904 | 20682 |
| 1 | [X] | 9 | IPIC 19th Stg | 8 | 10486 | 21222 |
| 1 | [X] | 10 | IPIC 13th Stg | 72 | 11893 | 20560 |
| 1 | [X] | 11 | IP DUMMY | 71 | 11449 | 20412 |

Menu: System  File  Collect/View  Report  Function Keys  Cursor Control

Calibration - Top Off    Date:

File: HPIP2    Plant:    Unit: 5    Section: HP/IP

FIG. 17

| System | File | Collect/View | Report | Function Keys | Cursor Control |

Tops Off Input File-Data (Inches)

Date:

| File: HPIP2 | Plant: | Unit: 5 | Section: HP/IP |

Data Set Number

Set Number 1

Transducer Position Iin Inches

| Bore Number | Description | Left | Bottom | Right | Top |
|---|---|---|---|---|---|
| 1 | T2 OB | 0.521 | 0.518 | 0.546 | 0.000 |
| 7 | #3 IP BR GE | 0.519 | 0.560 | 0.551 | 0.000 |
| 8 | #3 IP BR TE | 0.499 | 0.552 | 0.528 | 0.000 |
| 9 | IPIC 19th Stg | 0.454 | 0.491 | 0.481 | 0.000 |
| 10 | IPIC 13th Stg | 0.510 | 0.538 | 0.543 | 0.000 |
| 11 | IP DUMMY | 0.467 | 0.510 | 0.497 | 0.000 |
| 18 | LP DUMMY GE | 0.436 | 0.397 | 0.411 | 0.000 |

FIG. 19

| System | File | Collect/View | Report | Function Keys | Cursor Control |

TOPS OFF RAW DATA

Turbine Set Point Bore 23    Generator Set Point Bore 1

Date:            File Creatd on:            Page   2

Filename: HPIP2    Plant:    Unit: 5    Section: HP/IP

| Bore Number | Description | Set Number | Transducer Position in Inches | | | |
|---|---|---|---|---|---|---|
| | | | Left | Bottom | Right | Top |
| 8 | #3 IP BR TE | 2 | 0.496 | 0.552 | 0.525 | 0.000 |
| 8 | #3 IP BR TE | 3 | 0.496 | 0.551 | 0.527 | 0.000 |
| 9 | IPIC 19th Stg | 1 | 0.454 | 0.491 | 0.481 | 0.000 |
| 9 | IPIC 19th stg | 2 | 0.455 | 0.494 | 0.479 | 0.000 |
| 9 | IPIC 19th stg | 3 | 0.454 | 0.491 | 0.481 | 0.000 |

FIG. 21

| System | File | Collect/View | Report | Function Keys | Cursor Control |

Tops off (Variation) - Raw Data

Date:

| File: HPIP2 | Plant: | Unit: 5 | Section: HP/IP |

Data Set Number

Set Number 1

| Bore Number | Description | Transducer Position in Inches | | | |
|---|---|---|---|---|---|
| | | Left | Bottom | Right | Top |
| 1 | T2 OB | 0.565 | 0.531 | 0.505 | 0.000 |
| 3 | T2 SSB | 0.557 | 0.523 | 0.499 | 0.000 |
| 5 | #4 IP BR GE | 0.538 | 0.556 | 0.512 | 0.000 |
| 6 | #4 IP BR TE | 0.518 | 0.530 | 0.503 | 0.000 |
| 7 | #3 IP BR GE | 0.570 | 0.571 | 0.506 | 0.000 |
| 8 | #3 IP BR TE | 0.544 | 0.559 | 0.485 | 0.000 |
| 9 | IPIC 19th Stg | 0.490 | 0.500 | 0.436 | 0.000 |

FIG. 22

| System | File | Collect/View | Report | Function Keys | Cursor Control |

Tops On (Variation) Input File - Raw Data

Date:

| File: HPIP2 | Plant: | Unit: 5 | Section: HP/IP |

Data Set Number

Set Number 1

| Bore Number | Description | Transducer Position in Inches | | | |
|---|---|---|---|---|---|
| | | Left | Bottom | Right | Top |
| 1 | T2 OB | 0.435 | 0.388 | 0.338 | 0.000 |
| 3 | T2 SSB | 0.439 | 0.382 | 0.336 | 0.000 |
| 5 | #4 IP BR GE | 0.437 | 0.408 | 0.329 | 0.000 |
| 6 | #4 IP BR TE | 0.440 | 0.400 | 0.336 | 0.000 |
| 7 | #3 IP BR GE | 0.473 | 0.408 | 0.320 | 0.000 |
| 8 | #3 IP BR TE | 0.455 | 0.403 | 0.312 | 0.000 |
| 9 | IPIC 19th Stg | 0.432 | 0.392 | 0.298 | 0.000 |

FIG. 24

| System | File | Collect/View | Report | Function Keys | Cursor Control |

Ellipticity Input File-Raw Data (Inches)

Date:

| File: HPIP2 | Plant: | Unit: 5 | Section: HP/IP |

Data Set Number

Set Number 1

| Bore Number | Description | Transducer Position in Inches | | | |
|---|---|---|---|---|---|
| | | Left | Bottom | Right | Top |
| 1 | T2 OB | 0.674 | 0.537 | 0.396 | 0.000 |
| 5 | #4 IP BR GE | 0.618 | 0.523 | 0.389 | 0.538 |
| 6 | #4 IP BR TE | 0.605 | 0.508 | 0.389 | 0.535 |
| 7 | #3 IP BR GE | 0.611 | 0.525 | 0.390 | 0.549 |
| 8 | #3 IP BR TE | 0.599 | 0.532 | 0.389 | 0.552 |
| 9 | IPIC 19th Stg | 0.611 | 0.552 | 0.389 | 0.669 |
| 10 | IPIC 13th Stg | 0.574 | 0.503 | 0.390 | 0.588 |

FIG. 26

| System | File | Collect/View | Report | Function Keys | Cursor Control |

Joint Offset Input File - Raw Data

Date:

| File: | Plant: | Unit: 0 | Section: |

Data Set Number

Set Number 1
Set Number 2
Set Number 3   ducer Position (Data set #)

| Bore No. | Description | Left Top | Left Bot. | Right bot. | Right Top |
| --- | --- | --- | --- | --- | --- |
| 1 | BORE 1 | 0.512 | 0.510 | 0.515 | 0.510 |
| 2 | BORE 2 | 0.520 | 0.525 | 0.525 | 0.530 |
| 3 | BORE 3 | 0.200 | 0.203 | 0.210 | 0.215 |
| 4 | BORE 4 | 0.300 | 0.309 | 0.308 | 0.300 |
| 5 | BORE 5 | 0.400 | 0.401 | 0.408 | 0.410 |
| 6 | BORE 6 | 0.299 | 0.301 | 0.304 | 0.308 |
| 7 | BORE 7 | 0.300 | 0.304 | 0.304 | 0.308 |

FIG. 27

| System | File | Collect/View | Report | Function Keys | Cursor Control |

Joint Opening Input

Date:

| File: | Plant: | Unit: | Section: |

| Bore Number | Description | Joint Opening in Inches ||
|---|---|---|---|
| | | Left Side | Right Side |
| 1 | BORE 1 | 0.010 | 0.016 |
| 2 | BORE 2 | 0.002 | 0.004 |
| 3 | BORE 3 | 0.004 | 0.006 |
| 4 | BORE 4 | 0.008 | 0.008 |
| 5 | BORE 5 | 0.012 | 0.014 |
| 6 | BORE 6 | 0.016 | 0.018 |

FIG. 28

| System | File | Collect/View | Report | Function Keys | Cursor Control |

Ideal Line Data Input

Date:

| File: HPIP2 | Plant: | Unit: 5 | Section: HP/IP |

Ideal Line in Zero Reference Format

| Bore Number | Description | Left | Bottom | Right |
|---|---|---|---|---|
| 1 | T2 OB | 0 | 9 | 32 |
| 2 | TS OUTER GLAND | 0 | 0 | 0 |
| 3 | T2 SSB | 0 | 10 | 0 |
| 4 | T2 INNER GLAND | 0 | 15 | 0 |
| 5 | #4 IP BR GE | 0 | 20 | 0 |

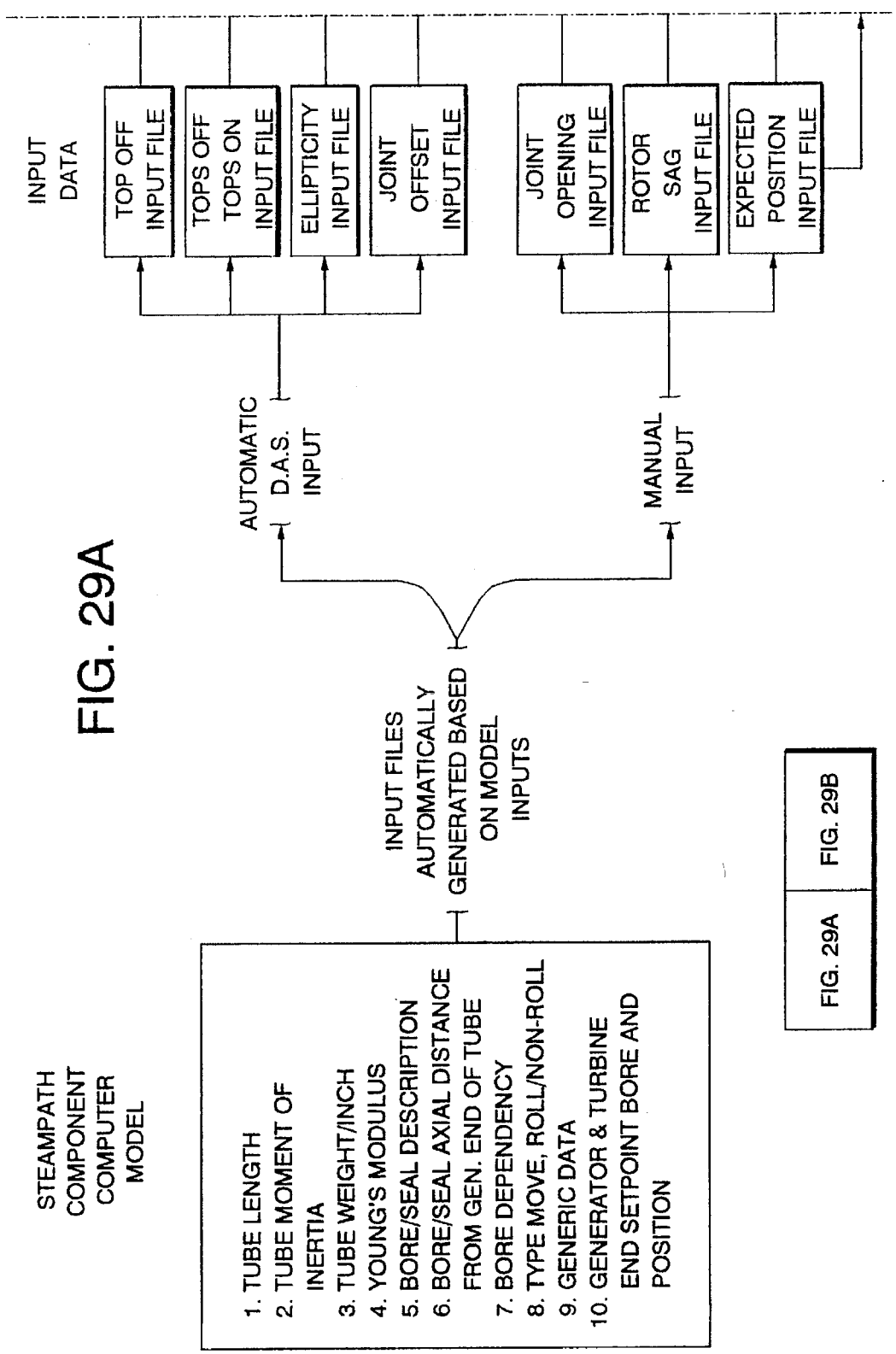

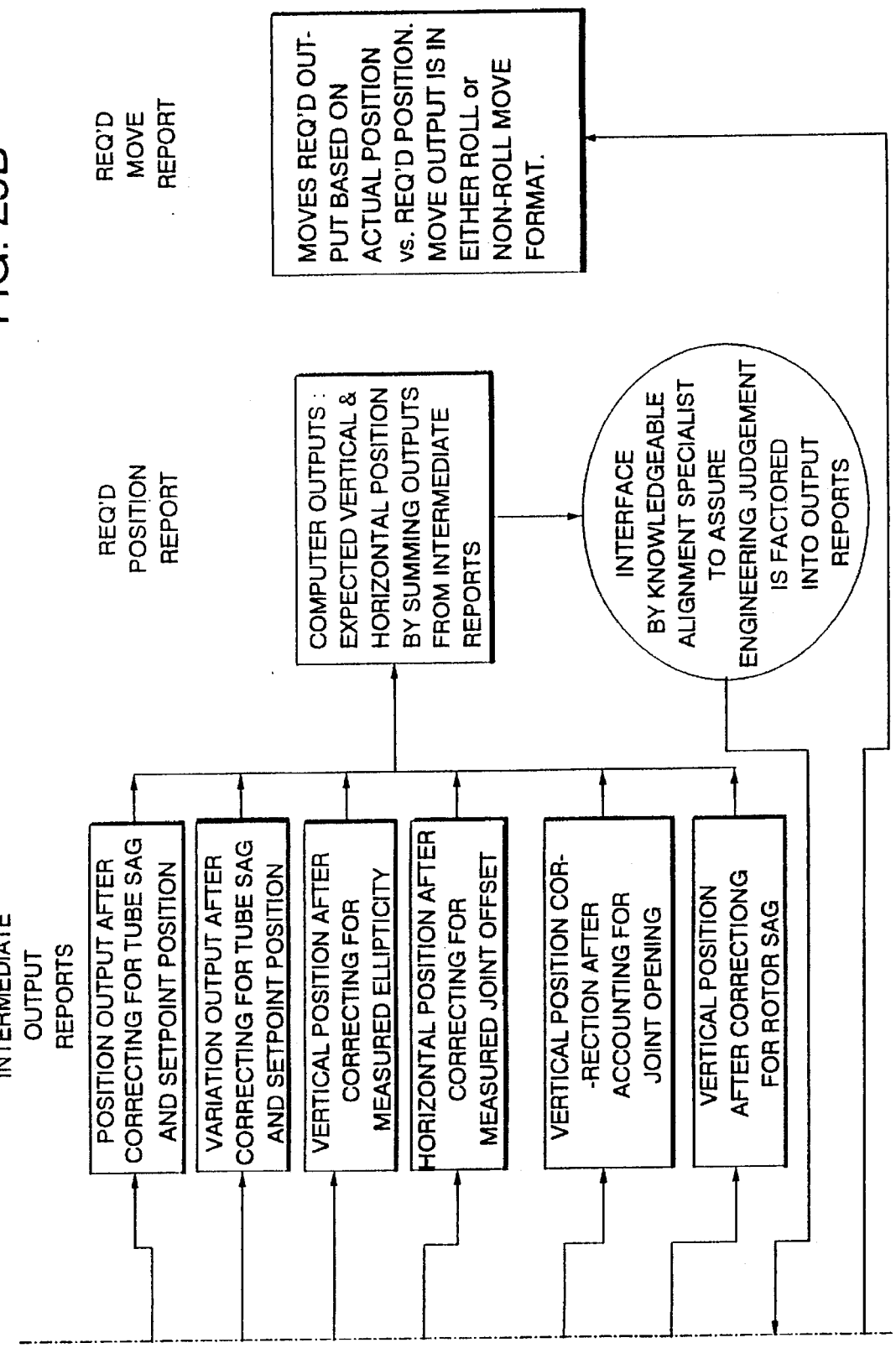

FIG. 30

| System | File | Collect/View | Report | Function Keys | Cursor Control |

Tops Off Converted Data Report    Report 2 of 4

Date:

File: HPIP2    Plant:    Unit: 3    Section: hpip

| Bore No. | Description | Avg of Data Sets | | | | CONVERTED TO MILS | | | |
|---|---|---|---|---|---|---|---|---|---|
| | | Left | Btm | Right | Top | Left | Btm | Right | Top |
| 1 | T2 Oil Bore | 0.246 | 0.335 | 0.377 | 0.000 | 246.8 | 335.6 | 377.1 | 0.0 |
| 2 | SPARE | 0.000 | 0.000 | 0.000 | 0.000 | 0.0 | 0.0 | 0.0 | 0.0 |
| 3 | T2 SS BORE | 0.340 | 0.290 | 0.353 | 0.000 | 340.9 | 290.3 | 353.6 | 0.0 |
| 4 | T2 INNER GLAND | 0.373 | 0.319 | 0.391 | 0.000 | 373.0 | 319.6 | 391.8 | 0.0 |
| 5 | LP DUMMY R3 | 0.372 | 0.308 | 0.369 | 0.000 | 372.5 | 308.4 | 369.6 | 0.0 |
| 6 | LP DUMMY R1 | 0.222 | 0.156 | 0.216 | 0.000 | 222.8 | 156.6 | 216.0 | 0.0 |
| 7 | HP BR R10 | 0.359 | 0.317 | 0.380 | 0.000 | 359.2 | 317.1 | 380.8 | 0.0 |

FIG. 31

| System | File | Collect/View | Report | Function Keys | Cursor Control |

Tops Off Converted Data Report    Report 3 of 4

Date:

File: CF5HPIP   Plant:    Unit: 5    Section: hp/ip

| Bore No. | Descr. | Sag Mils | SAG CORRECTED IN MILS | | | | ZERO REF. FORMAT | | | |
|---|---|---|---|---|---|---|---|---|---|---|
| | | | Left | Btm | Right | Top | Left | Btm | Right | Top |
| 7 | #3 IP BR | 67.6 | 519.0 | 627.6 | 551.0 | 0.0 | 0.0 | 108.6 | 32.0 | 0.0 |
| 8 | #3 IP BR | 72.1 | 499.0 | 624.1 | 528.0 | 0.0 | 0.0 | 125.1 | 29.0 | 0.0 |
| 9 | IPIC 19th | 73.1 | 454.0 | 564.1 | 481.0 | 0.0 | 0.0 | 110.1 | 27.0 | 0.0 |
| 10 | IPIC 13th | 75.7 | 510.0 | 613.7 | 543.0 | 0.0 | 0.0 | 103.7 | 33.0 | 0.0 |
| 11 | IP DUMMY | 75.8 | 467.0 | 585.8 | 497.0 | 0.0 | 0.0 | 118.8 | 30.0 | 0.0 |
| 12 | HP DUMMY | 75.1 | 0.0 | 0.0 | 0.0 | 0.0 | 0.0 | 0.0 | 0.0 | 0.0 |
| 13 | HP DUMMY | 72.0 | 0.0 | 0.0 | 0.0 | 0.0 | 0.0 | 0.0 | 0.0 | 0.0 |

FIG. 32

System  File  Collect/View  Report  Function Keys  Cursor Control

===== TOPS OFF MOVED TO SETPOINT    REPORT 4 OF 4 =====

Date:

File: CF5HPIP | Plant: | Unit: 5 | Section: hp/ip

Turbine Set Point Bore  23 | Generator Set Point Bore  1

| Bore No. | Rotor Bore Description | ZERO REF-AT SETPOINTS | | | | BORE POS TO TUBE/BEAM | |
|---|---|---|---|---|---|---|---|
| | | | | | | VERTICAL | HORIZONTAL |
| | | Left | Btm | Right | Top | + = Low<br>- = High | + = Right<br>- = Left |
| 7 | #3 IP BR GE | 0.0 | 89.3 | 34.6 | 0.0 | 72.0 | 17.3 |
| 8 | #3 IP BR TE | 0.0 | 108.3 | 30.3 | 0.0 | 93.1 | 15.1 |
| 9 | IPIC 19th STG | 0.0 | 94.1 | 28.0 | 0.0 | 80.0 | 14.0 |
| 10 | IPIC 13th STG | 0.0 | 91.1 | 32.3 | 0.0 | 74.9 | 16.1 |
| 11 | IP DUMMY | 0.0 | 108.3 | 28.2 | 0.0 | 94.2 | 14.1 |
| 12 | HP DUMMY GE | 0.0 | 0.0 | 0.0 | 0.0 | 0.0 | 0.0 |
| 13 | HP DUMMY TE | 0.0 | 0.0 | 0.0 | 0.0 | 0.0 | 0.0 |

FIG. 33

| | | TOPS OFF/ON: TOPS OFF VARIATION | | REPORT 3 OF 6 | | |
|---|---|---|---|---|---|---|
| | | | | | Date: | |

| File: CF5HPIP | Plant: | Unit: 5 | Section: hp/ip |
|---|---|---|---|

| Turbine Set Point Bore: 23 | Generator Set Point Bore: 1 |
|---|---|

| | | ZERO REF-AT SETPOINTS | | | | BORE POS TO TUBE/BEAM | |
|---|---|---|---|---|---|---|---|
| Bore No. | Tops Off Description | Left | Btm | Right | Top | VERTICAL<br>+ = Low<br>- = High | HORIZONTAL<br>+ = Right<br>- = Left |
| 1 | T2 OB | 0.0 | 9.0 | 32.0 | 0.0 | -7.0 | 16.0 |
| 2 | T2 OUTER GLAND | 0.0 | 0.0 | 0.0 | 0.0 | 0.0 | 0.0 |
| 3 | T2 SSB | 0.0 | 17.3 | 25.0 | 0.0 | 4.8 | 12.5 |
| 4 | T2 INNER GLAND | 0.0 | 0.0 | 0.0 | 0.0 | 0.0 | 0.0 |
| 5 | #4 IP BR GE | 0.0 | 77.1 | 47.2 | 0.0 | 53.5 | 23.6 |
| 6 | #4 IP BR TE | 0.0 | 77.4 | 48.4 | 0.0 | 53.2 | 24.2 |
| 7 | #3 IP BR GE | 5.1 | 73.9 | 0.0 | 0.0 | 71.4 | -2.5 |

FIG. 34

| System File Collect/View Report Function Keys Cursor Control |
|---|

| TOPS OFF/ON: TOPS ON VARIATION     REPORT 5 OF 6 |
|---|

| Date: |
|---|

| File: CF5HPIP | Plant: | Unit: 5 | Section: hp/ip |
|---|---|---|---|

| Turbine Set Point Bore 23 | Generator Set Point Bore 1 |
|---|---|

| Bore No. | Tops On Description | ZERO REF-AT SETPOINTS | | | | BORE POS TO TUBE/BEAM | |
|---|---|---|---|---|---|---|---|
| | | | | | | VERTICAL<br>+ = Low<br>− = High | HORIZONTAL<br>+ = Right<br>− = Left |
| | | Left | Btm | Right | Top | | |
| 1 | T2 OB | 0.0 | 9.0 | 32.0 | 0.0 | −7.0 | 16.0 |
| 2 | T2 OUTER GLAND | 0.0 | 0.0 | 0.0 | 0.0 | 0.0 | 0.0 |
| 3 | T2 SSB | 0.0 | 10.7 | 23.9 | 0.0 | −1.2 | 11.9 |
| 4 | T2 INNER GLAND | 0.0 | 0.0 | 0.0 | 0.0 | 0.0 | 0.0 |
| 5 | #4 IP BR GE | 0.0 | 50.2 | 16.7 | 0.0 | 41.8 | 8.3 |
| 6 | #4 IP BR TE | 0.0 | 49.1 | 18.4 | 0.0 | 39.9 | 9.2 |

FIG. 35

| | | System File Collect/View Report Function Keys Cursor Control | | | | | | |
|---|---|---|---|---|---|---|---|---|
| | | TOPS OFF/ON-(VARIATION) - VARIATION  REPORT 6 OF 6 | | | | | | |

File: CF5HPIP | Plant: | Unit: 5 | Section: hp/ip

Turbine Set Point Bore: 23 | Generator Set Point Bore: 1

| Bore No. | Description | CALCULATED VARIATION | | ZERO REFERENCE LINE CORRECTION | | | | BR POS TO TUBE | |
|---|---|---|---|---|---|---|---|---|---|
| | | VERT +=Dn -=Up | HORZ +=Rt -=Lft | Left | Btm | Right | Top | VERT +=Low -=High | HORIZ +=Right -=Low |
| 6 | #4 IP BR TE | -13.2 | -15.0 | 0.0 | 28.3 | 30.0 | 0.0 | 13.2 | 15.0 |
| 7 | #3 IP BR GE | -27.3 | -13.2 | 0.0 | 40.5 | 26.4 | 0.0 | 27.3 | 13.2 |
| 8 | #3 IP BR TE | -30.9 | -7.1 | 0.0 | 38.0 | 14.2 | 0.0 | 30.9 | 7.1 |
| 9 | IPIC 19th ST | -15.9 | -4.0 | 0.0 | 20.0 | 8.1 | 0.0 | 15.9 | 4.0 |
| 10 | IPIC 13th ST | -37.1 | -8.2 | 0.0 | 45.3 | 16.4 | 0.0 | 37.1 | 8.2 |
| 11 | IP DUMMY | -52.6 | -2.5 | 0.0 | 55.2 | 5.1 | 0.0 | 52.6 | 2.5 |

FIG. 36

| | | System | File | Collect/View | Report | Function Keys | Cursor Control | | |
|---|---|---|---|---|---|---|---|---|---|

ELLIPTICITY - LINE CORRECTION    REPORT 3 OF 3

Date:

| File: CF5HPIP | Plant: | Unit: 5 | Section: hp/ip |
|---|---|---|---|

| Bore No. | Description | LINE CORRECTION ZERO REFERENCE FORMAT | | | POSITION CORRECTION |
|---|---|---|---|---|---|
| | | | | | VERTICAL |
| | | Left | Btm | Right | += Low<br>- = High |
| 6 | #4 IP BR TE | 0.0 | 24.5 | 0.0 | 24.5 |
| 7 | #3 IP BR GE | 0.0 | 36.5 | 0.0 | 36.5 |
| 8 | #3 IP BR TE | 0.0 | 48.0 | 0.0 | 48.0 |
| 9 | IPIC 19th STG | 0.0 | 110.5 | 0.0 | 110.5 |
| 10 | IPIC 13th STG | 0.0 | 63.5 | 0.0 | 63.5 |
| 11 | IP DUMMY | 0.0 | 48.0 | 0.0 | 48.0 |

FIG. 37

System  File  Collect/View  Report  Function Keys  Cursor Control

JOINT OPENING - LINE CORRECTION    REPORT 1 OF 1

Date:

File: HPIP1    Plant:    Unit: 5    Section: HPIP

| Bore No. | Description | MEASURED GAP (MILS) | | ZERO REFERENCE LINE CORRECTION | | |
|---|---|---|---|---|---|---|
| | | Left Side | Right Side | Left | Btm | Right |
| 1 | T2 OB | 4.0 | 6.0 | 0.0 | 1.6 | 0.0 |
| 2 | T2 SSB | 10.0 | 8.0 | 0.0 | 3.0 | 0.0 |
| 3 | IP#4 BR,GE | 4.0 | 6.0 | 0.0 | 1.6 | 0.0 |
| 4 | IP#4 BR,TE | 8.0 | 6.0 | 0.0 | 2.3 | 0.0 |
| 5 | IP#3 BR,GE | 8.0 | 10.0 | 0.0 | 3.0 | 0.0 |
| 6 | IP#3 BR,TE | 8.0 | 5.0 | 0.0 | 2.1 | 0.0 |

FIG. 38

| System | File | Collect/View | Report | Function Keys | Cursor Control |

JOINT OFFSET - LINE CORRECTION      REPORT 2 OF 2

Date:

| File: | Plant: | Unit: 1 | Section: na |

| Bore No. | Description | LINE CORRECTION ZERO REFERENCE FORMAT | | | HORIZONAL POSITION CORRECTION |
|---|---|---|---|---|---|
| | | Left | Btm | Right | + = Right<br>- = Left |
| 1 | Bore 1 | 0.0 | 3.0 | 6.0 | 3.0 |
| 2 | Bore 2 | 0.0 | 9.0 | 18.0 | 9.0 |
| 3 | Bore 3 | 0.0 | 0.0 | 0.0 | 0.0 |
| 4 | Bore 4 | 6.0 | 3.0 | 0.0 | -3.0 |
| 5 | Bore 5 | 4.0 | 2.0 | 0.0 | -2.0 |
| 6 | Bore 6 | 0.0 | 3.0 | 6.0 | 3.0 |

FIG. 39

| System | File | Collect/View | Report | Function Keys | Cursor Control |

IDEAL LINE - LINE CORRECTION    REPORT 1 OF 1

Date:

File: HPIP1    Plant:    Unit: 5    Section: HPIP

| Bore No. | Description | ZERO REFERENCE LINE | | |
|---|---|---|---|---|
| | | Left | Btm | Right |
| 1 | T2 OB | 0.0 | 0.0 | 0.0 |
| 2 | T2 SSB | 0.0 | 0.0 | 0.0 |
| 3 | IP#4 BR.GE | 0.0 | 15.0 | 0.0 |
| 4 | IP#4 BR.TE | 0.0 | 15.0 | 0.0 |
| 5 | IP#3 BR.GE | 0.0 | 15.0 | 0.0 |
| 6 | IP#3 BR.TE | 0.0 | 20.0 | 0.0 |

FIG. 40A

EXPECTED LINE POSITIONS

REPORT 1 OF 2

| File: CF5HPIP | Plant: | Unit: 5 | Section: hp/ip |
|---|---|---|---|
| Turbine Set Point Bore 23 | | Generator Set Point Bore 1 | Date: |

POSITION CORRECTION TO GET EXPECTED LINE

| Bore No. | ELLIPTICITY | | VARIATION | | JOINT OFFSET | | JOINT OPEN | | IDEAL | |
|---|---|---|---|---|---|---|---|---|---|---|
| | VER. +=Lo -=Hi | HOR +=Rt -=Lt | VER. +=Lo -=Hi | HOR +=Rt -=Lt | VER. +=Lo -=Hi | HOR +=Rt -=Lt | VER. +=Lo -=Hi | HOR +=Rt -=Lt | VER. +=Lo -=Hi | HOR +=Rt -=Lt |
| 6 | 24.5 | 0.0 | 13.2 | 15.0 | 0.0 | 0.0 | 0.0 | 0.0 | 20.0 | 0.0 |
| 7 | 36.5 | 0.0 | 27.3 | 13.2 | 0.0 | 0.0 | 0.0 | 0.0 | 20.0 | 0.0 |
| 8 | 48.0 | 0.0 | 30.9 | 7.1 | 0.0 | 0.0 | 0.0 | 0.0 | 20.0 | 0.0 |
| 9 | 110.5 | 0.0 | 15.9 | 4.0 | 0.0 | 0.0 | 0.0 | 0.0 | 20.0 | 0.0 |
| 10 | 63.5 | 0.0 | 37.1 | 8.2 | 0.0 | 0.0 | 0.0 | 0.0 | 20.0 | 0.0 |
| 11 | 48.0 | 0.0 | 52.6 | 2.5 | 0.0 | 0.0 | 0.0 | 0.0 | 20.0 | 0.0 |

FIG. 40B

Expected Line     Report 2 of 2     Date:

| File: CF5HPIP | Plant: | Unit: 5 | Section: hp/ip |

Turbine Set Point Bore: 23     Generator Set Point Bore: 1

| Bore No. | Description | EXPECTED POSITION | | EXPECTED LINE | | |
|---|---|---|---|---|---|---|
| | | VERTICAL<br>+ = Low<br>- = High | HORIZONTAL<br>+ = Right<br>- = Left | Left | Btm | Right |
| 6 | #4 IP BR TE | 57.7 | 15.0 | 0.0 | 72.8 | 30.0 |
| 7 | #3 IP BR GE | 83.8 | 13.2 | 0.0 | 97.0 | 26.4 |
| 8 | #3 IP BR TE | 98.9 | 7.1 | 0.0 | 106.0 | 14.2 |
| 9 | IPIC 19th STG | 146.4 | 4.0 | 0.0 | 150.5 | 8.1 |
| 10 | IPIC 13th STG | 120.6 | 8.2 | 0.0 | 128.8 | 16.4 |
| 11 | IP DUMMY | 120.6 | 2.5 | 0.0 | 123.2 | 5.1 |

FIG. 41

```
 System   File   Collect/View   Report   Function Keys   Cursor Control
```

=========== EXPECTED LINE DATE INPUT ===========

File: HPIP9     Plant:          Unit:   5      Section: HP/IP

Bore                                    Expected Line (Zero Ref.)
Number   Description                    Left    Bottom    Right

| Number | Description   | Left | Bottom | Right |
|--------|---------------|------|--------|-------|
| 3      | T2 SSB        | 0    | 17     | 2     |
| 4      | T2 INNER GLAND| 0    | 15     | 0     |
| 5      | #4 IP BR GE   | 0    | 69     | 31    |
| 6      | #4 IP BR TE   | 0    | 64     | 30    |
| 7      | #3 IP BR GE   | 0    | 76     | 24    |

FIG. 42

| | | | | ROLL MOVE SHIM CHANGE | | NON-ROLL MOVE SHIM TO STATIONARY PART NOT TO PIN | | |
|---|---|---|---|---|---|---|---|---|
| | | Net Move Required | | | | | | |
| Bore No. | Desc | Vert +=Up -=Down | Horiz. +=Right -=Left | LEFT SIDE +=Add -=Remove | RIGHT SIDE +=Add -=Remove | LEFT SIDE +=Add -=Remove | RIGHT SIDE +=Add -=Remove | VERTICAL +=Add -=Remove |
| 6 | #4 IP | 0.0 | 0.0 | 0.0 | 0.0 | 0.0 | 0.0 | 0.0 |
| 7 | #3 IP | 8.0 | -5.3 | 0.0 | 0.0 | 5.3 | -5.3 | 8.0 |
| 8 | #3 IP | 9.6 | -7.6 | 0.0 | 0.0 | 7.6 | -7.6 | 9.6 |
| 9 | IPIC | -36.9 | -11.0 | 0.0 | 0.0 | 11.0 | -11.0 | -36.9 |
| 10 | IPIC | -27.5 | -8.6 | 0.0 | 0.0 | 8.6 | -8.6 | -27.5 |
| 11 | IP DJ | -1.2 | -12.6 | 0.0 | 0.0 | 12.6 | -12.6 | -1.2 |

MOVES REQUIRED - SHIM MOVES    REPORT 1 OF 1

File: CF5HPIP    Plant:    Unit: 5    Section: hp/ip

\* Note: Actual Total Moves = Tops Off - Expected Line

INTERNAL ALIGNMENT OF ROTATING AND STATIONARY COMPONENTS WITHIN A STEAM OR GAS TURBINE

FIELD OF THE INVENTION

This invention relates to systems used during maintenance overhaul of steam or gas turbines to determine the required position of internal flowpath parts so that the parts may be properly reassembled with appropriate spacing to prevent internal rubbing and resultant wear. More particularly, the invention relates to automated data taking within the turbine and computer-assisted data analysis to facilitate accurate internal alignment of turbine rotating and stationary components. In particular embodiments, the automated data taking and analysis is achieved using a single cable, multi-measurement module system controlled by a laptop computer.

DESCRIPTION OF PRIOR ART

During the overhaul of large utility turbine generators plans are typically made to replace damaged seals that reduce unit output from stage to stage or prevent steam or gas from leaking to atmosphere. The purpose for replacing these seals is to improve the efficiency of the turbine section and thus reduce the fuel cost of operating the unit. After damaged seals have been replaced, a series of checks are performed to the stationary turbine parts having seals to assure that the seals are properly aligned to the turbine rotor and thus prevent unwanted vibration, rubs, rotor damage, and reduced unit performance and efficiency at startup and during future operation.

The series of alignment checks noted above consist of:

(a) establishing the concentricity and parallelism of the rotor couplings to each other;

(b) establishing the individual turbine rotor radial position at the turbine and generator ends of each turbine section; and (c) establishing the internal alignment of the stationary parts to the rotating rotors.

After utilizing standard means for establishing rotor concentricity and parallelism and establishing the radial position of the rotor on both turbine and generator ends of each turbine section, the last phase of the alignment process is to establish the internal alignment of the stationary parts to the rotor.

The task is done by determining the following information:

(1) Whether the part is elliptical or not and, if so, then what the position reading will be if elliptical. Ellipticity only affects the apparent vertical position of a flowpath part.

(2) The extent of position change ("variation") when the top half of the inner and outer shells is on and bolted. Once the values of the vertical and horizontal variation are determined, the part would be offset in the opposition direction of the variation.

(3) The extent to which the horizontal joints of the flowpath part being measured are offset. If this offset is not extensive enough to require a repair, it must be accounted for and only impacts horizontal position of the part.

(4) The extent that the horizontal joints are open after bolting is stretched to design values. If the joints do not close completely an engineering judgement must be made as to the expected (if any) vertical move a flowpath part will make if the joints close when the turbine is at operating temperature.

(5) The amount of turbine rotor sag at each flowpath component axial location. These values are typically supplied by the turbine manufacturers.

The desired position of any individual flowpath component is determined by summing the vertical and horizontal position data from the above as noted below:

$$DVPi = VEi + VVi + HJVi + RSVi$$

where $DVPi$ = desired vertical position of the ith flowpath component $VEi$ = apparent vertical position due to ellipticity of the flowpath part $VVi$ = vertical position adjustments due to variation from unbolted to bolted condition $HJVi$ = vertical position adjustments due to the horizontal joints being open after the bolts are tightened to design stress $RSVi$ = vertical position adjustments due to rotor sag at the specific axial position of the part and $$DHPi = HVi + HJOi$$

where $DHPi$ = desired horizontal position of the ith flowpath component $HVi$ = horizontal position adjustment due to variation $HJOi$ = horizontal position adjustment due to the horizontal joint offset between the upper and lower halves of the flowpath component After the desired positions $DVPi$ and $DHPi$ are determined they are compared to actual position and moves are determined for each flowpath part in the turbine section.

Methods used in the past to perform this task along with problems typically experienced with each method are described below:

1) Tightwire Method

As typically employed, this method requires the use of a 0.016" diameter steel wire with either a 28 or 30 pound weight hanging on the end to provide tension in the wire and for use in calculation of wire deflection as a function of axial distance from the wire support. Once the wire is strung, it is physically moved on each end of the turbine section until it is in the proper radial position established in (b) above. The means for determining the proper radial position is by taking micrometer distance measurements between the setpoint bore ID and the wire in either 3 or 4 locations, i.e., left, bottom, right and top. Once the distance readings are taken, they are converted to a relative reading and the deflection of the wire at that particular setpoint bore is added to the bottom reading. The new relative reading is compared to the desired setpoint reading and if necessary the wire is moved to obtain the required position. After the wire is established in the correct position, one then goes to each location in the turbine that requires a proper alignment to the rotating element and repeats the readings previously described above. There are typically 20–30 locations requiring at least 3–4 readings at each. After taking the above readings, a recheck of the wire to setpoints is made and generally another full set of readings is taken to assure data repeatability. Some of the problems typically experienced using this method are:

(a) during the process of taking readings, the wire moves and is no longer at setpoint which means that data taken at the other locations in the turbine are not relative to the turbine centerline—thus readings have to be retaken;

(b) when the top half of the turbine parts are installed, it may not be possible to get readings due to space limitations; and (c) the taking of readings to a wire is complicated by wind conditions which may cause the wire to move, by rain which affects the reading, by sunlight which moves the wire, by operation of units nearby which cause the wire to vibrate, and by the competence and ability of the person taking the readings.

Each problem noted above results in a long, arduous, time-consuming process to obtain accurate data and move the parts where they need to be located. This, in turn, extends the length of the overhaul and cost the utility in replacement generation and labor.

2) Optical Or Laser Methods

Optical alignment readings are taken using a Faround scope which establishes a line of sight relative to two target setpoint bores—one on each end of the turbine section. Targets are placed in other flowpath bore locations and their centerlines compared to the line of sight established at the setpoint targets.

Laser alignment is similar to optical alignment except the laser establishes the centerline relative to two target bores—one on each end of the turbine section. Targets having photo cells are located in all flowpath bores to be aligned. When the laser beam intersects the photocell a voltage is produced relative to the photocell center which is at the center of the flowpath bore. This is then converted to a readout in inches in the x and y directions that give the offset.

Typical problems with the optical and laser methods are:

(1) very time consuming;

(2) requires a person going into the machine with the tops on which many times is impossible;

(3) if the targets are located on bores that are deformed as a result of the top half being off then these targets are suspect to slip relative to the bore where the top half is bolted on thus giving erroneous readings; and (4) line of sight or laser beam bending due to thermal gradients along the axial length of the turbine section which will give erroneous readings.

3) Mandrel/Proximity Transducer Method

This method uses a mandrel (bar or tube) which has multiple eddy current transducers mounted axially along the length to read at specific flowpath bores, after the mandrel has been centered at two setpoint bores. Each eddy current probe has its own individual wire lead which is connected to a proximity module having specific electrical circuits and power supply to operate the probes. The mandrel is rotated to 3 or 4 positions, i.e., left, bottom, right, or top position and the gap is recorded at each position. The bottom and top reading are manually corrected for the tube sag at each location and the data is then corrected to a relative reading using techniques normally employed by persons familiar with this process.

Typical problems associated with the mandrel/proximity method are:

(1) The eddy current (proximity) transducer size typically used has a range of 0.000 to 0.080 inches due to the width of the bore target the transducer measures. If the target width is too small, the magnetic flux lines produced by the coils in the probe tip will lap over the edge of the target. This situation produces eddy currents in the metal surface that are not proportional to the gap. Thus a reading error is produced.

(2) The limited range of the probes can result in errors. The limited range may also result in the operator not being able to obtain a reading at all of the bores being measured, for example where there is more than 0.080 inches ellipticity or where the centerline variation between the bolted and unbolted condition exceeds 0.080 inches. Both of these problems are frequently experienced on old utility turbines.

(3) If the bore being read by the eddy current (proximity) transducer has its resistivity vary around the circumference then the gap reading recorded will be in error. This is particularly true if the bore has been weld repaired which may be likely on older units.

(4) An eddy current (proximity) probe cannot read on a stationary seal as the flux lines overlap the seal creating a gap error.

(5) Most turbines require that at least 20–30 bores be read. If there are 20–30 eddy current transducers on the mandrel, then there are 20–30 wires that will be pulled off the end of the tube to be connected to a box having a proximity module and power supply. This requires each wire to be properly labeled for each axial location; otherwise correct readings may be taken, but they will be at the wrong location. Additionally, the numerous wires are a trip hazard and unsightly.

(6) The mandrel holding the probes sits on a mechanical support that has to be manually moved to setpoint on both ends; this is time consuming.

(7) When the top half is on, the probes still need to be calibrated which can be difficult to impossible, depending on the size of equipment.

(8) The use of the mandrel/proximity transducer system is not conducive to measure both large and small diameter bores simultaneously, thus increasing time to do this work.

Of the methods previously described, none are adequate to handle the many possible problems that are normally encountered when aligning the flowpath internals to the rotor centerline.

SUMMARY OF THE INVENTION

According to the present invention, the above problems heretofore associated with the internal alignment of steam turbine rotating and stationary components are overcome by provision of an automated system that acquires alignment data and processes the data to provide vertical and horizontal position information for each component to obtain a desired position that properly locates the component. Among the objectives and goals of the present invention are the following:

(1) Align the internal flowpath components to the rotor centerline while accounting for all or a number of:

(a) component ellipticity;

(b) component centerline position change (variation) from an unbolted to bolted condition;

(c) rotor deflection;

(d) horizontal joint offset; and (e) horizontal joint opening.

(2) Accurately and repeatably obtain the alignment data with the ability to account for large amounts of component ellipticity and variation with no error.

(3) Provide a single cable serially connecting all information-generating transducers to eliminate the need for a single cable per transducer and the attendant unreliability and clutter associated therewith.

(4) Have the ability to calibrate all transducers at once and at any time desired rather than calibrating each transducer separately or not being able to calibrate due to interference caused by the top half components being installed.

(5) Eliminate the need for having to locate the transducer mandrel or tube to setpoint position by making these corrections based on computer calculation.

(6) Have the ability to take measurement with equal ease regardless of whether the top half components are on or off.

(7) Have the ability to read the alignment of the actual seal in addition to the bore in which the seal is placed.

(8) Perform instant computer analysis of data by:

(a) accounting and correcting for mandrel/tube sag due to its uniformly distributed weight and the point load weights of the transducers and transducer holders;

(b) mathematically adjusting the data for the required setpoint position and bore and have the ability to change these variables if desired;

(c) determining the position location of the flowpath components to rotor centerline by summing the position corrections associated with data items 1a through 1e, above;

(d) calculating the required move (vertically and horizontally) of each component to bring them to the required position; and (e) accounting for the dependence of the move of one flowpath part to other parts. For example, if a stationary nozzle ring can independently move and is located inside an inner shell that is located inside an outer shell, then the nozzle ring is dependent on the move of the inner shell and the outer shell.

(9) Have the ability to read small diameter bores or seals and large diameter bores or seals in the same setup.

(10) Improve data accuracy and reliability by taking multiple (e.g., three) readings at each left, bottom, right and top position and then averaging the data at each position.

(11) Significantly reduce the time required to perform alignment tasks during maintenance overhauls while eliminating problems associated with other alignment methods previously discussed.

The above objectives are accomplished by positioning a mandrel or tube of sufficient diameter and axial length within the turbine section after the rotor, top half outer shell, inner shell, blade rings and glands have been removed. The tube is supported on mechanical supports which allow the tube to rotate, allow the tube to be moved vertically and horizontally for quick close proximity positioning to the setpoint bores of the turbine section and allow the tube to be moved during simultaneous calibration of the position transducers. Attached to the tube are a plurality of (e.g., 32) highly accurate measurement modules each of which includes a transducer for producing an output signal proportional to relative position. Each module has its own independent interface electronics that digitizes the data obtained from the transducer and communicates with the master controller computer. The measurement modules are connected in series fashion via a single cable which obtains power from and communicates with the master controller computer via an interface module. Data from each measurement module is transmitted to the computer where it is manipulated by appropriate software to convert the data to inches using appropriate calibration equations generated during the calibration process. The software corrects the bottom and top (if taken) readings by the amount of tube deflection at a specific measurement module axial location by use of appropriate equations. At the two setpoint bores (one at each end of the turbine section) a comparison is made of actual position to required position; if the tube is not at desired position, the software mathematically moves the tube to the correct position and recalculates new values for the remaining bores being measured left, bottom, right and top readings. In determining the required position of the flowpath parts so that design clearances are achieved when the turbine section is assembled, the user has to obtain data items 1a–1e, above, at each bore location. Data items 1a, 1b and 1d are obtained with the aforementioned process; data items 1c and 1e are manually input. Computer software sums the vertical and horizontal position information generated from data items 1a–1e to obtain a desired position that properly locates each flowpath part. This is compared to the actual position of the part, with the difference being the move necessary to achieve the desired position.

BRIEF DESCRIPTION OF THE DRAWINGS

Some of the objects having been stated, other objects will appear as the description proceeds, when taken in connection with the accompanying drawings, in which

FIG. 5 is a pictorial view of the primary components of the invention.

FIG. 6 is a pictorial view of a measurement module.

FIG. 8 is a pictorial view of the measurement module chain before attachment to a tube.

FIG. 8A is a schematic of the circuitry of the interface electronics.

FIG. 10 is a view of a typical input sheet used to develop a computer model of the turbine component.

FIG. 11 is an end view showing the transition tabs in place.

FIG. 14 is a typical calibration screen shown by the computer.

FIG. 16 is a typical calibration screen showing actual transducer identification numbers and calibration data.

FIG. 17 is a typical input data screen for "Tops Off" data file.

FIG. 19 is a typical computer screen showing comparison of three data sets taken at each flowpath location.

FIG. 21 shows a Tops Off/On Data-Top Off input file.

FIG. 22 shows a Tops Off/On Data-Top On input file.

FIG. 24 shows an ellipticity input file.

FIG. 26 shows a joint offset input file.

FIG. 27 shows a joint opening input file.

FIG. 28 is an ideal line (rotor segment) input file.

FIG. 29 is a computer software flow diagram for the invention.

FIG. 30 is a typical example of an output report showing data being converted to inches and averaged.

FIG. 31 is a report showing data being converted to mils and "zero reference corrected."

FIG. 32 is a report showing data being adjust to setpoints and converted to position relative to the tube.

FIG. 33 is a report showing Tops Off/On-Top Off position to tube.

FIG. 34 is a report showing Tops Off/On-Top On position to tube.

FIG. 35 is a Tops Off/On report showing variation, line correction, and required loose position to tube.

FIG. 36 is an ellipticity report showing position and line correction.

FIG. 37 is a joint opening output report.

FIG. 38 is a joint offset output report.

FIG. 39 is an ideal line (rotor segment) output report.

FIGS. 40A and 40B are a two-part expected position output report.

FIG. 41 is an expected position input report generated after review/adjustment by a knowledgeable engineer.

FIG. 42 is an output report for component moves.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figures 1, 1A:
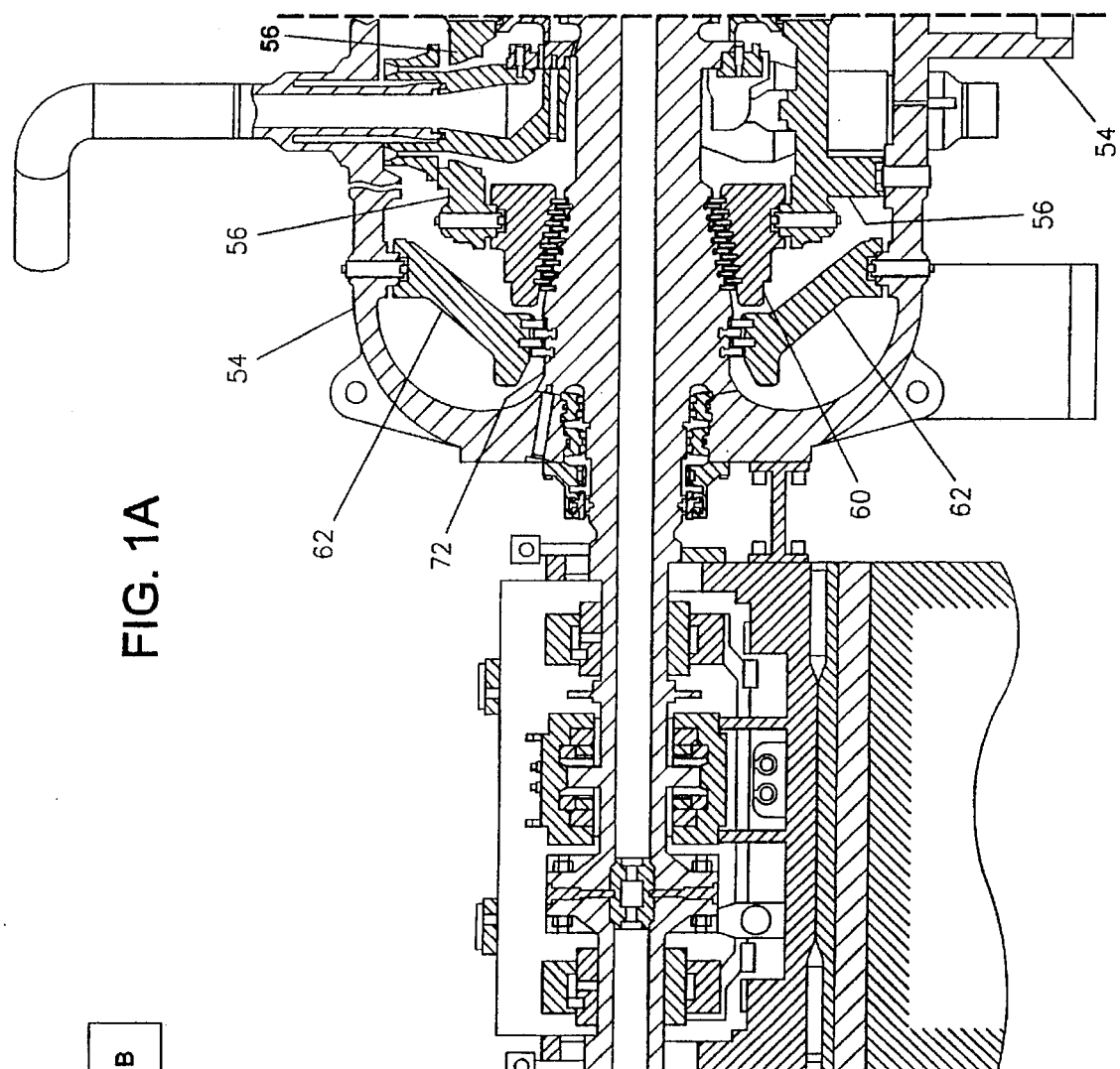
FIG. 1 is a cross section of a typical high pressure turbine section of a large utility steam turbine.
Figure 1B:
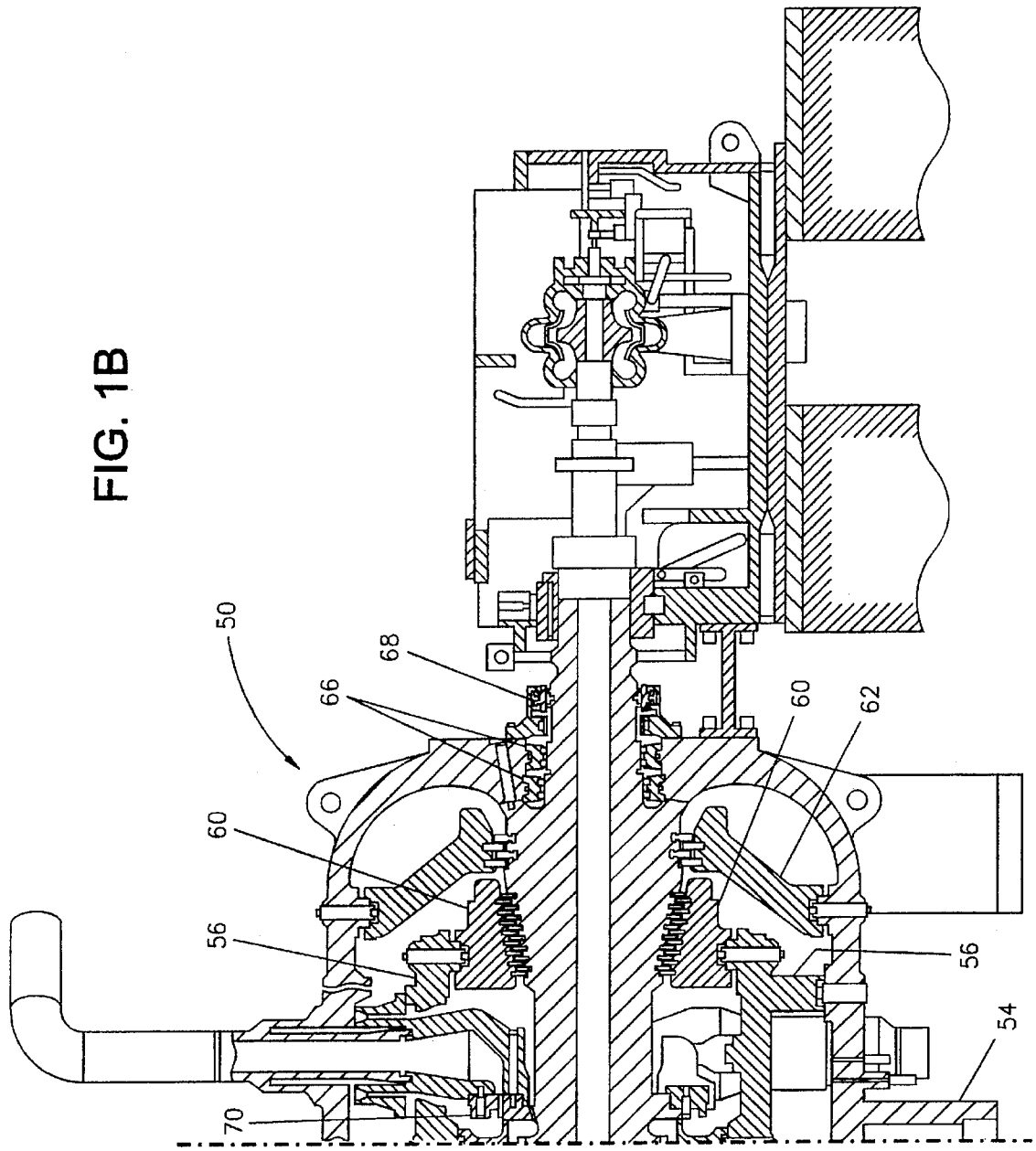

Referring to FIG. 1, there is shown a cross section of the double flow, high pressure section 50 of a steam turbine. The illustrated turbine section 50 is the high pressure section of a large tandem compound utility steam turbine of the type well known in the art and which includes the high pressure section, an intermediate pressure section and two low pressure sections. While the invention will be described primarily with reference to high pressure section 50, it will be appreciated that the invention has application to the intermediate and low pressure sections, as well as to the various sections of other forms of utility and industrial steam and gas turbines, including the steam turbines of a conventional nuclear power plant.

High pressure turbine section 50 has an outer shell 54, an inner shell 56, first high pressure blade ring 60, second high pressure blade ring 62, inner glands 66, outer glands 68, inlet nozzles 70 and a turbine rotor 72.

Figure 2:
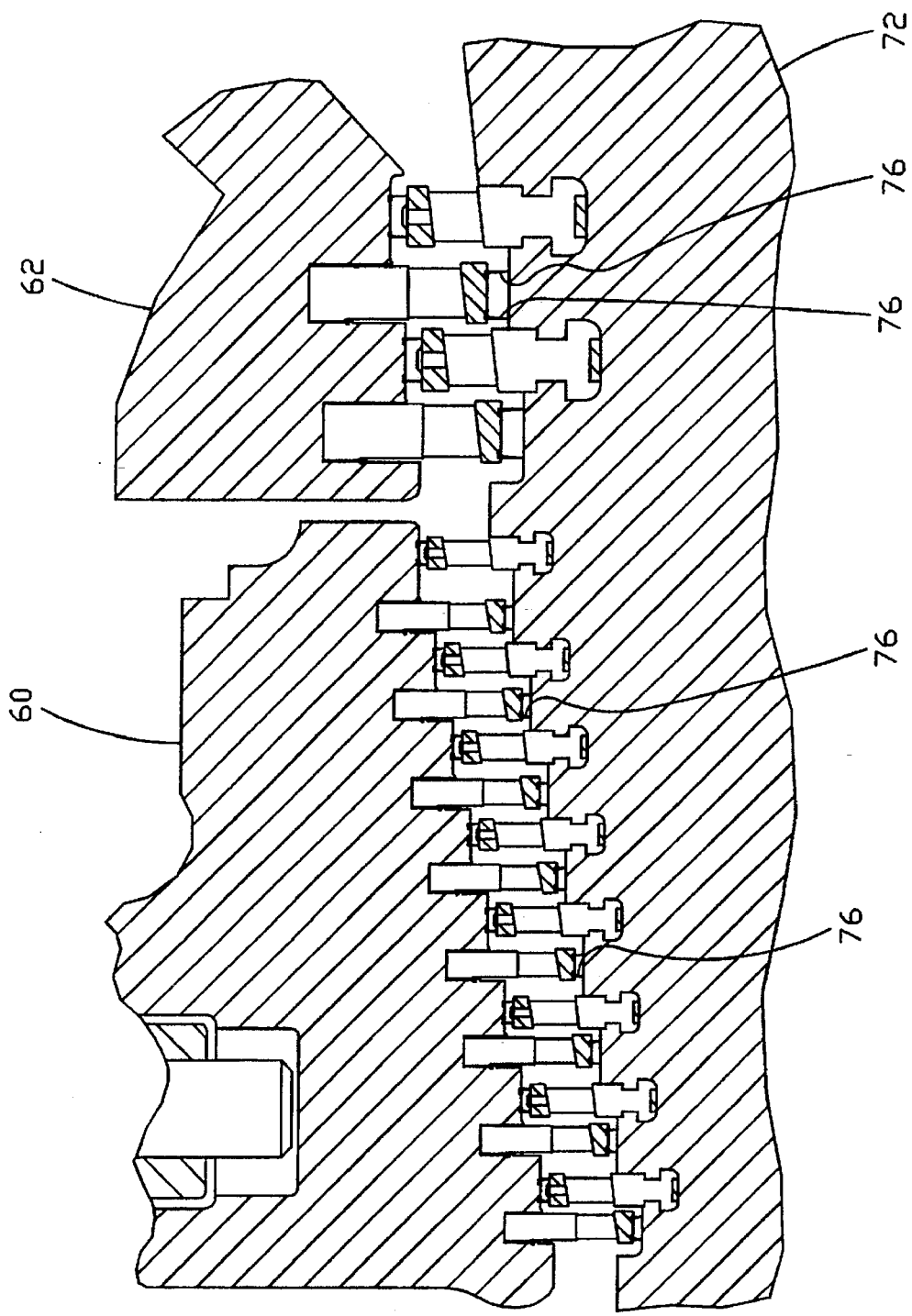
FIG. 2 is a cross section of a typical turbine flowpath in the high pressure section illustrated in FIG. 1.

FIG. 2 is an enlarged view of first and second high pressure blade ring 60, 62 in which stationary seals 76 seal between the rotor body and blading in the manner well known in the art. Seals 76 define clearances in the range of 0.030" to 0.035" in order to reduce turbine stage leakage and thus optimize turbine performance and efficiency.

Figure 3:
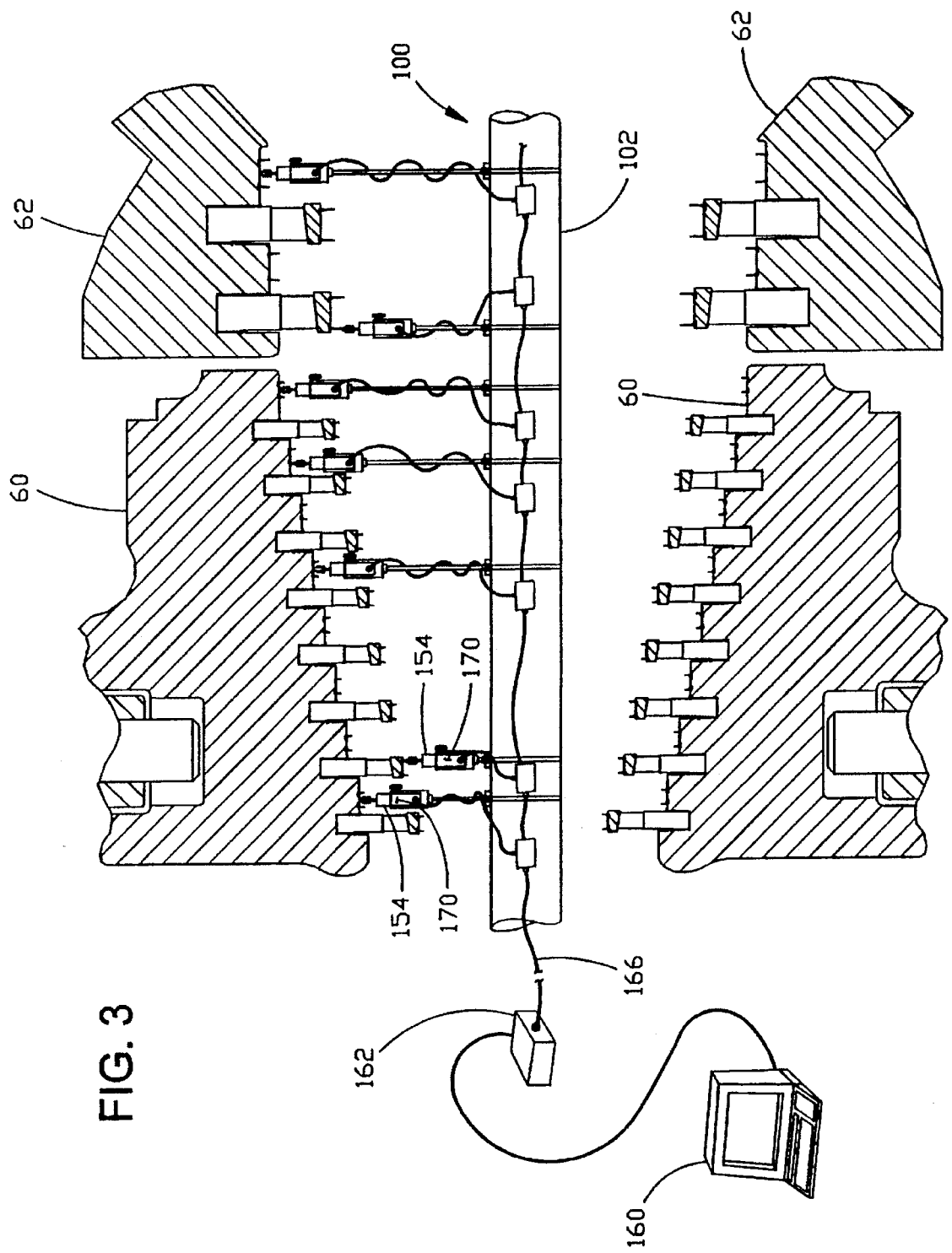
FIG. 3 ms a cross section in plan of a flowpath section with the invention installed.
Figure 4:
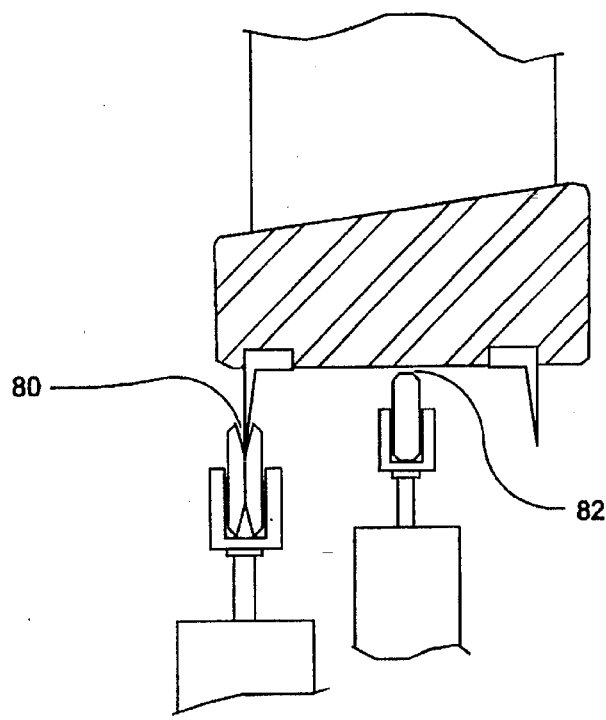
FIG. 4 is a greatly enlarged view showing two measurements module contact points.
Figure 9:
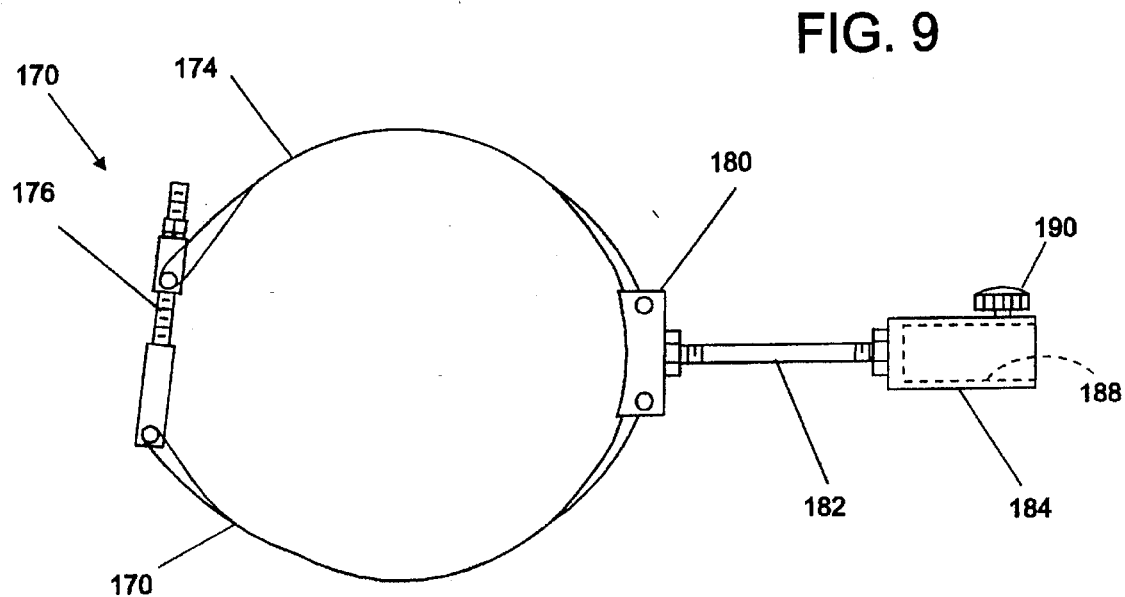
FIG. 9 is a side view of a transducer support for mounting a transducer to the tube.
Figure 7:
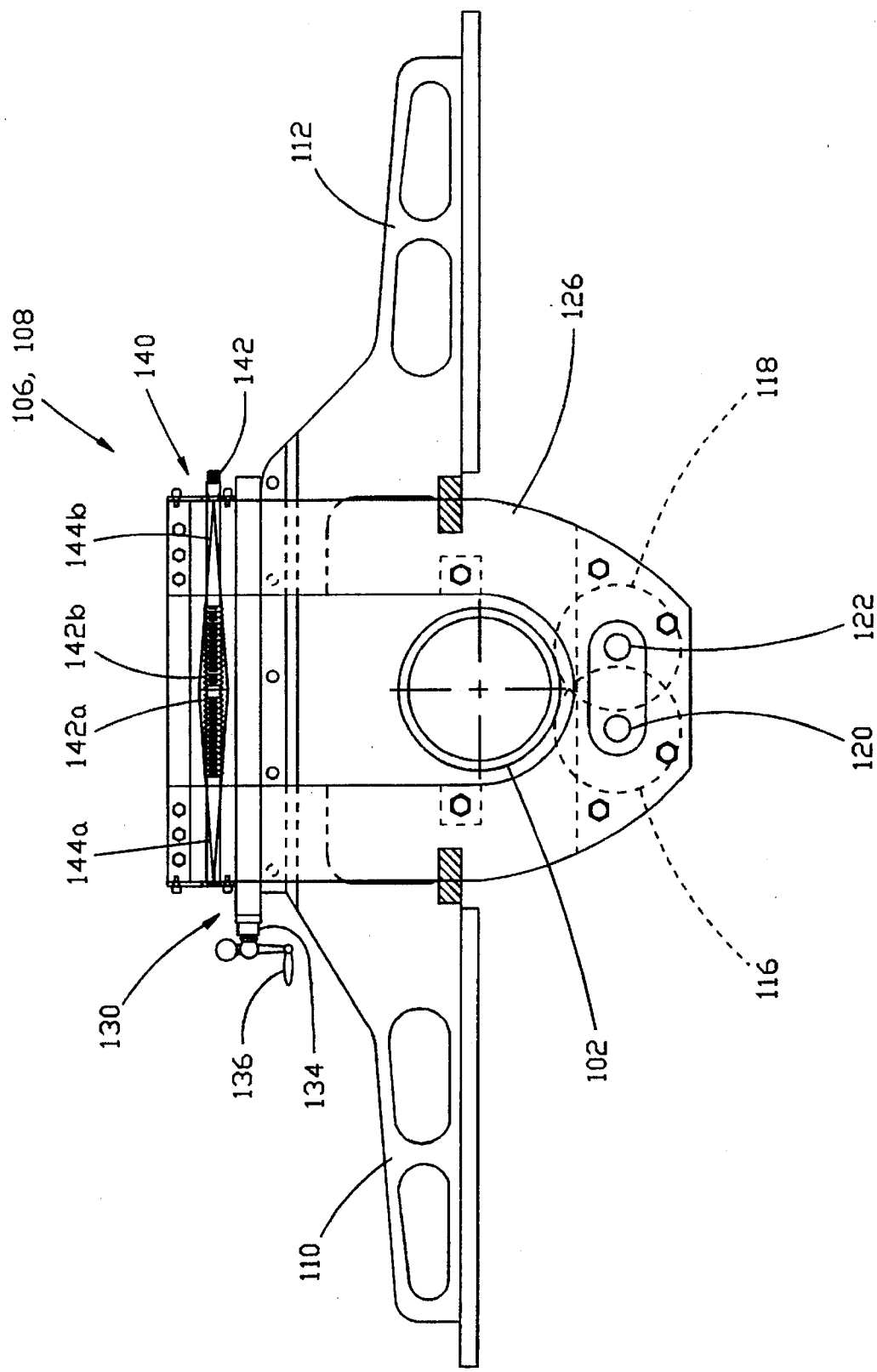
FIG. 7 is an end view of one mechanical support for the mandrel or tube.

FIG. 3 is a partial plan view in which the turbine rotor 72, top half outer shell 54, inner shell 56, and glands 68 are removed with the invention installed. FIG. 4 is a greatly enlarged view showing respective measurement module transducer contact points for reading a sealface 80 and reading a hard bore 82. As is well known in the art, in this context each "hard bore" is a machined part of a blade ring body.

The principle system components of the present invention will now be described with reference to FIGS. 5-9, followed by a detailed description of the operation of the system in a representative data acquisition and analysis operation.

The automated data acquisition and analysis system 100 includes a mandrel or tube 102 that is placed within the turbine section as shown in FIG. 3. Tube 102 is sized as required to match up to any turbine section depending on that section's inner diameters and axial length. In one preferred embodiment, for use in connection with the high pressure section of a Westinghouse type BB-222-57-373-373 steam turbine, tube 102 takes the form of a steel tube having an outside diameter of 7¼ inches and a length of approximately 20 feet. Tube 102 is supported to span the tube section by a pair of identical mechanical supports 106, 108 (FIGS. 5 and 7) that are fixedly mounted external of turbine section 50. Supports 106, 108 allow tube 102 to rotate and be moved vertically and horizontally for quick close proximity positioning to the setpoint bores of the turbine section. The positioning of the tube by supports 106, 108 also facilitates calibrating the measurement modules, as described in more detail below. While the invention will be described in connection with the use of tube 102, it will be appreciated that other rigid elongate structural members such as an I-beam, truss, bar, or similar structure may be used. The rigid elongate structural member must be capable of carrying the transducers and permitting the transducers to be rotated with respect to the surrounding components of the turbine section.

In a preferred embodiment, mechanical supports 106, 108 (FIG. 7) include a pair of mounting brackets 110, 112 for securement to the turbine pedestal (not shown). A pair of roller wheels 116, 118 are mounted on respective pins 120, 122 that are journaled in a housing 126. The roller wheels 116, 118 support tube 102 at each end so that the tube may be manually rotated to the Left, Right, Top, Bottom positions for data acquisition as described in more detail below.

Mechanical supports 106, 108 also include a precision slide arrangement 130 for providing horizontal and vertical displacement for tube 102 for use in data acquisition and calibration operations. In the illustrated embodiment, slide arrangement 130 includes a threaded rod 134 and associated handle 136 for articulating tube 102 in the horizontal direction. Slide arrangement 130 is used to move the tube both left and right in calibration operations, described below.

Mechanical supports 106, 108 additionally include an elevation wedge assembly 140 for articulating tube 102 in the vertical direction. In the illustrated embodiment, wedge assembly 140 includes a threaded rod 142 having opposite hand thread portions 142a, 142b that move inwardly or outwardly together upon rotation of rod 142, thus raising and lowering carriage 126 and tube 102 resting thereon in response to the vertical displacement of wedge members 144a, 144b as they are acted upon by thread portions 142a, 142b, respectively.

Tube 102 carries multiple measurement modules 150 each of which includes a transducer 154 and transducer interface electronics 156. In a preferred embodiment, tube 102 may carry up to 32 measurement modules 150 to form a measurement module chain as shown in FIG. 8. The transducer can be any suitable electronic device that produces an output signal that is related to a relative position, such as an LVDT (linear variable differential transformer), a potentiometer, or other devices. In preferred embodiments the transducers 154 take the form of a model no. D5/400A/99 LVDT sold by RDP Electrosense of Pottstown, Pa., U.S.A., having a linear range of 0.80 inch, or a model no. MLT-201 potentiometer manufactured by Data Instruments, Inc. of Acton, Mass., U.S.A., having a linear range of 1.00 inch. Transducers having a linear range greater than about 0.80 inch are preferred for use of the present invention with utility turbines to accommodate situations where there are relatively large amounts of component ellipticity, tube sag, component misalignment and/or variation. It will be appreciated that when the present invention is used in alignment situations with smaller utility and industrial turbines having lower operating temperatures, bearing spans and machine output, the sum of expected component ellipticity, tube sag, component misalignment and variation is significantly less than is the case for larger utility/industrial applications. Thus, the linear range of the transducers used for such smaller utility and industrial turbine applications may be substantially smaller than those described above.

The interface electronics 156 are inserted into a protective housing and have five functions, namely: (1) to supply excitation to the transducer, (2) to read the transducer output signal, (3) to preprocess the transducer output signal, (4) to digitize the output signal and (5) to communicate the digitized signal value to a master controller computer 160 through an interface module 162. A schematic of interface electronics 156 is shown in FIG. 8A.

The interface module 162 (FIGS. 5 and 8) includes a power supply and communications electronics between RS485 and RS232 and has two functions, namely: (1) to serve as a communication link between the computer 160 and interface electronics 156 of the measurement modules 150 and (2) to provide power to measurement modules 150.

A single cable 166 (FIGS. 5 and 8) carries power and communications signals from interface module 162 to each measurement module 150 in the chain.

Master controller computer 160, preferably a conventional laptop computer, is coupled with software which provides communication with the measurement modules, performs data acquisition, and performs data analysis, output reporting and printing, all as described in greater detail below.

A transducer support 170 (FIG. 9) is provided for each transducer to secure the transducer to tube 102 at the appropriate axial location. Support 170 includes a tube clamp 172 having a circular band 174 and closure assembly 176 for securement around tube 102. Band 174 mounts a tube block 180, adjustable length rod 182 and transducer clamp 184 for holding the transducer in the desired orientation and radial spacing from tube 102. The transducer (not shown in FIG. 9) is located in recess 188 in clamp 184 and held in place by operation of thumb screw 190.

DESCRIPTION OF OPERATION

As previously described, in order to determine the required position of flowpath parts to a centerline established by setpoints on each end of a turbine section and to determine the move necessary to achieve the required position for each part, one needs to:

(A) run a tops off position check to find where the components are;

(B) determine the vertical and horizontal variation when the upper half components are unbolted and then bolted;

(C) determine the ellipticity of the part;

(D) determine the joint offset of the part;

(E) assess the joint opening when the parts are bolted; and (F) determine the rotor sag at each flowpath component. Item (E) is a manual input as is item (F) and are determined by those familiar in performing alignment of flowpath components. Item (A) through (D) are automatically determined using the invention as will be described in detail below.

The four steps in operation of the invention are:

Step 1. Develop turbine component model

Step 2. Install and setup the system

Step 3. Calibrate

Step 4. Take alignment data

Each of these steps is applied to each input described in items (A)–(D) above. In Step 1 (development of turbine component model) the analytical model for the particular components is built into the computer software and allows for communication and data acquisition to take place in Steps 2–4. FIG. 10 is a representative computer screen that outlines the typical data input necessary to accomplish this step. FIG. 10 shows a situation where data is to be taken at twenty-five hard bore and seal locations of a high pressure/ intermediate pressure (HPIP) steam turbine section that has a single rotor through the high and intermediate pressure zones. The modeling step includes entry of data representative of the physical characteristics of tube 102; namely, length (240 inches), weight (2.5250 lb./in.), Young's modulus ($29.0 \times 10^6$ psi) and moment of inertia ($49.5000 \times inches^4$). This data is used in tube deflection calculations discussed in more detail below.

The screen of FIG. 10 also includes data defining the two setpoints used in the model. The turbine end setpoint is shown as bore number 2 (of 25) and the generator end setpoint is shown as bore number 16. The setpoints are presented in zero reference format, a convention well known to those skilled in the art.

Lastly, the screen of FIG. 10 presents generic information for each of the twenty-five hard bore and seal locations (with information for only bores 1–3 being shown on the screen— the remaining information for bores 4–25 being available by simply scrolling to that information). The generic information for each location includes (1) the axial distance of the location from the generator end of the tube, (2) the transducer weight at the location, (3) whether the adjustment at the location is a roll or no-roll move and (4) whether the move at the location is dependent on the move of another bore pair.

It will be appreciated by those skilled in the art that the modeling format described herein facilitates "what if" analysis, i.e., looking at the data in different ways by simply changing model input information. For example, the operator may modify the model's set point locations and/or setpoint readings by simple data entries into the computer, and thereby run a "what if" analysis having substantial value to the operation and analysis of the alignment problem.

In Step 2 (installation and setup) mechanical supports 106, 108 are installed on the turbine pedestal at each end of the turbine component and tube 102 is then placed in the mechanical support such that there is no tube overhang over the ends of the mechanical support rollers 116, 118. A transducer support 170 is then axially located on tube 102 at each position where a measurement module 150 will be reading. These reading locations are typically a radial hard bore or a seal in a particular flowpath component of the turbine section. At this time measurement modules 150 are installed and the transducer position is adjusted radially outward to surface-riding engagement by adjustment rod 182 to read the desired hard bore or seal. Next, measurement modules 150 are connected to each other in a series fashion using single cable 166 to form a measurement module chain that is in turn connected to interface module 162 and master controller computer 160.

Referring to FIG. 11, the installation and setup procedure is continued by installing transition tabs 200, 202 on the right and left side horizontal joints 206, 208 of lower flowpath component 210 (positioned within outer shell 54 and inner shell 56) to prevent transducer damage when a transducer rolls above the horizontal joint and then below the joint. To this end, transition tabs 200, 202 are formed with ramps 212, 214 that are preferably formed of a suitable material such as plexiglass. Ramps 212, 214 are provided with an angular orientation and height chosen to permit a transducer that passes joint 206 or 208 to come to rest on the ramp without undue shock and to terminate its motion before reaching the upper end of the ramp. In one preferred embodiment, for use at radial distances from 16 inches to 120 inches from the centerline of the turbine section, the ramp may be inclined from the tangent line T at an angle X on the order of 15° and the ramp has a height on the order of 2.90 inches. Transition tabs 200, 202 may be removably secured in place by any suitable means, such as rubber magnets 216, 218.

Figure 12:
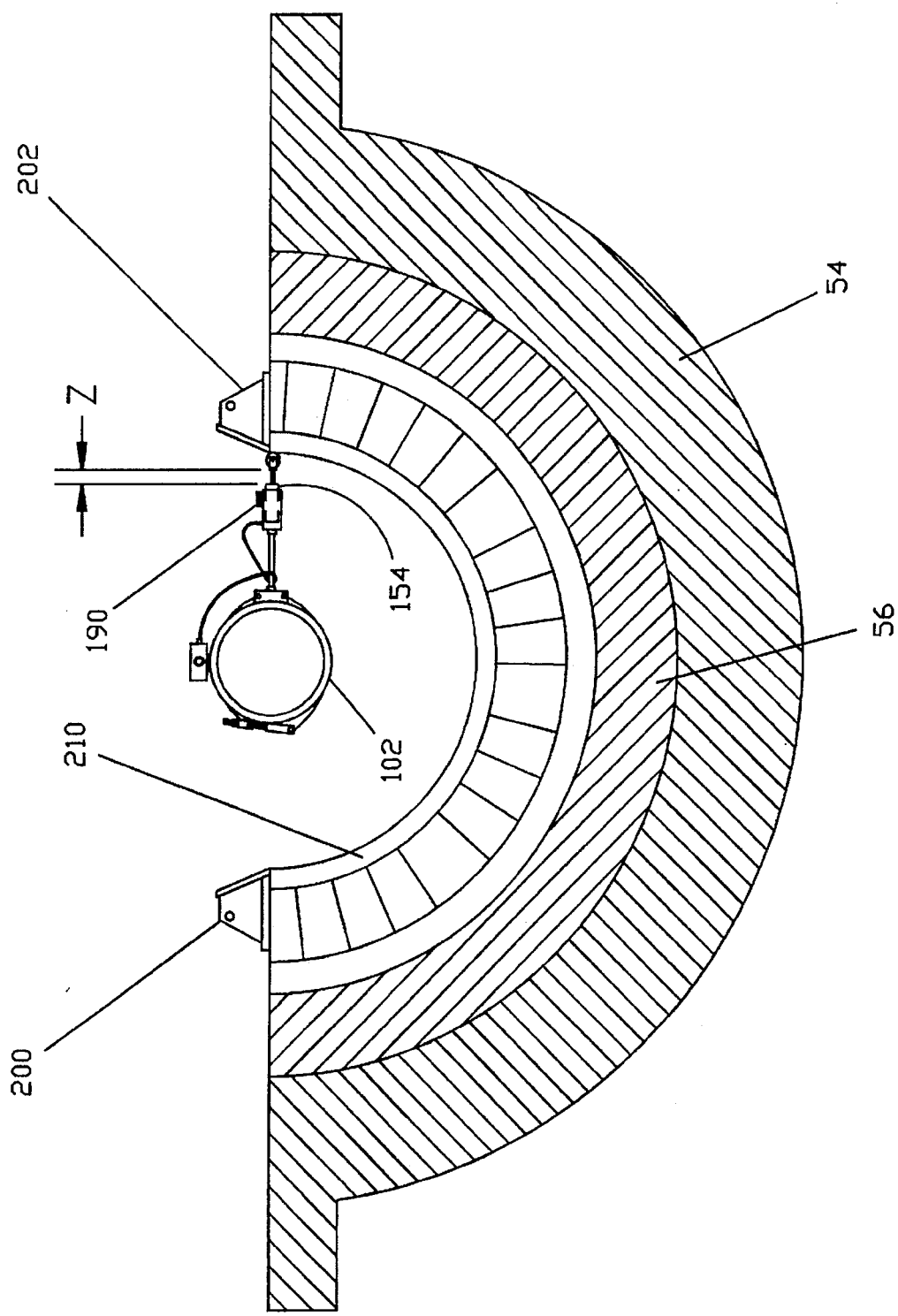
FIG. 12 is a cross section view showing setting of a transducer to "null position."

Referring to FIG. 12, the installation and setup procedure continues by setting the "null position" at the center of the linear stroke range for each transducer. For a transducer having a linear stroke range of 1.00 inch, the null position is set at 0.50 inch by using thumb screw 190 to permit positioning the transducer so it resides on the hard bore or seal at the midrange of its stroke.

Figure 13:
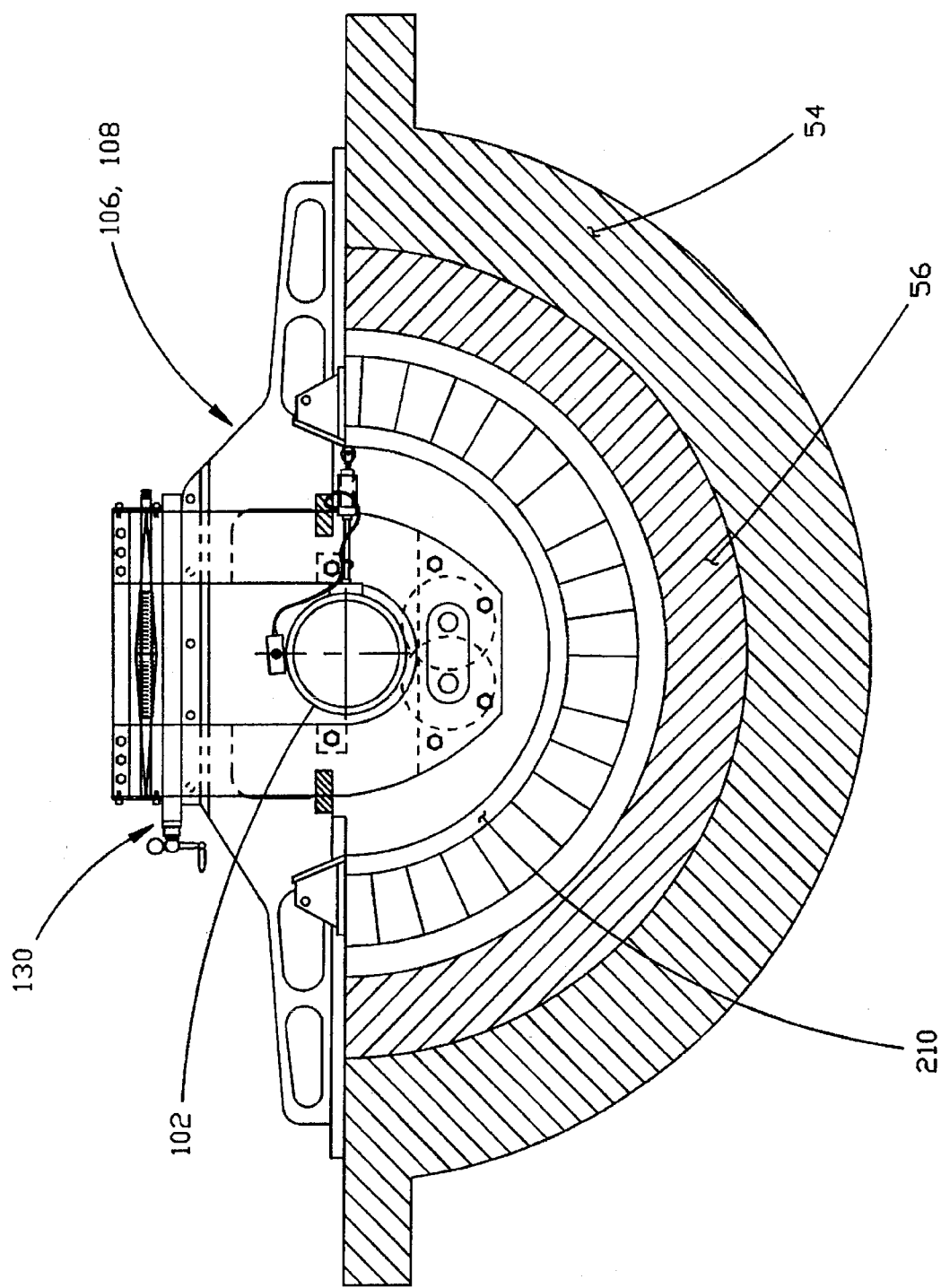
FIG. 13 is a cross section view showing the transducer calibration procedure.

After setting the null position the user proceeds to Step 3 (calibration) where the measurement modules are calibrated by using mechanical supports 106, 108 to move the tube 102 a specified distance for "retracted" calibration and then a specified distance for "extended" calibration. As an example, and with reference to FIG. 13, transducer 154 is first placed on the right just below the joint, as illustrated. Next, using the above described precision slide arrangement 130 on each of supports 106 and 108, tube 102 is moved a specified distance, e.g., 0.30 inches, to the right for retracted calibration and then the same distance to the left for extended calibration. This calibration data is recorded by the computer as shown on the representative computer screen of FIG. 14, which shows a situation where transducers at bore locations 7, 8, 9, 10 and 11 have been calibrated and the transducer at bore location 6 has been deactivated.

Figure 15:
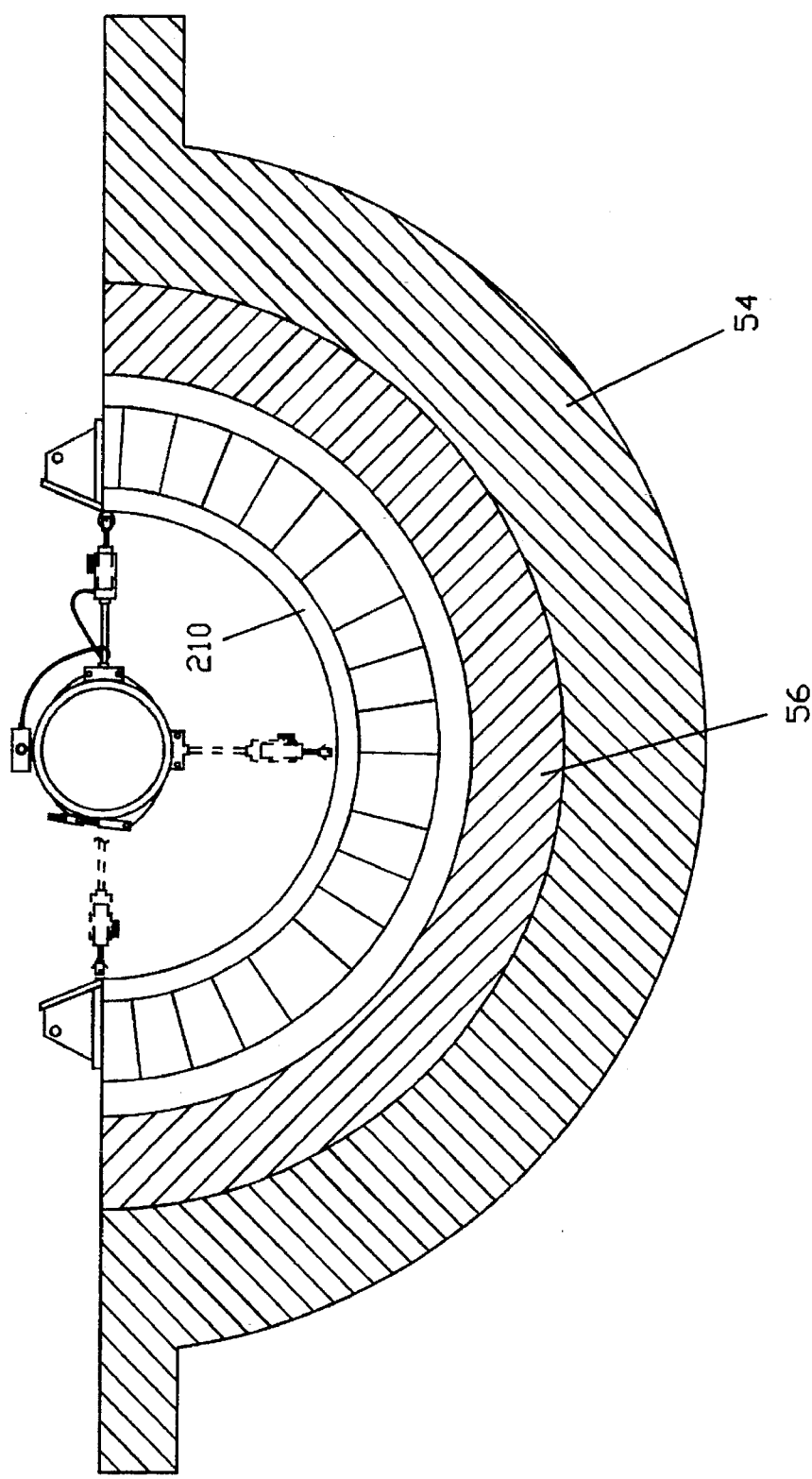
FIG. 15 is a cross section showing readings taken to confirm tube location to setpoint.

Since it is not certain where tube 102 is relative to its setpoint position at the turbine and generator setpoints, the next operation is to rotate tube 102 to Left, Bottom, and Right positions, respectively, and data is recorded at each position as shown in FIG. 15. The data from the transducer is converted to inches from the calibration equations and is accessed via computer reports. The user compares the tube position to desired position at the setpoint location and adjusts the mechanical supports 106, 108 as necessary to bring tube 102 within 0.025" of position. Since large moves may be required by the tube, the transducers' "null positions" are reset after the above action and the system is ready for taking the previously mentioned alignment data items: (A) tops off, (B) tops off/tops on, (C) ellipticity and (D) joint offset.

In taking alignment data (A)–(D), tube 102 will stay at its setpoint on each end; thus, tube 102 will not be required to be moved for position purposes. However, the tube should be moved for calibration each day that data is taken to assure that temperature/humidity changes which may affect the interface electronics or the transducer do not impact data accuracy.

Tops Off Data

Figure 18:
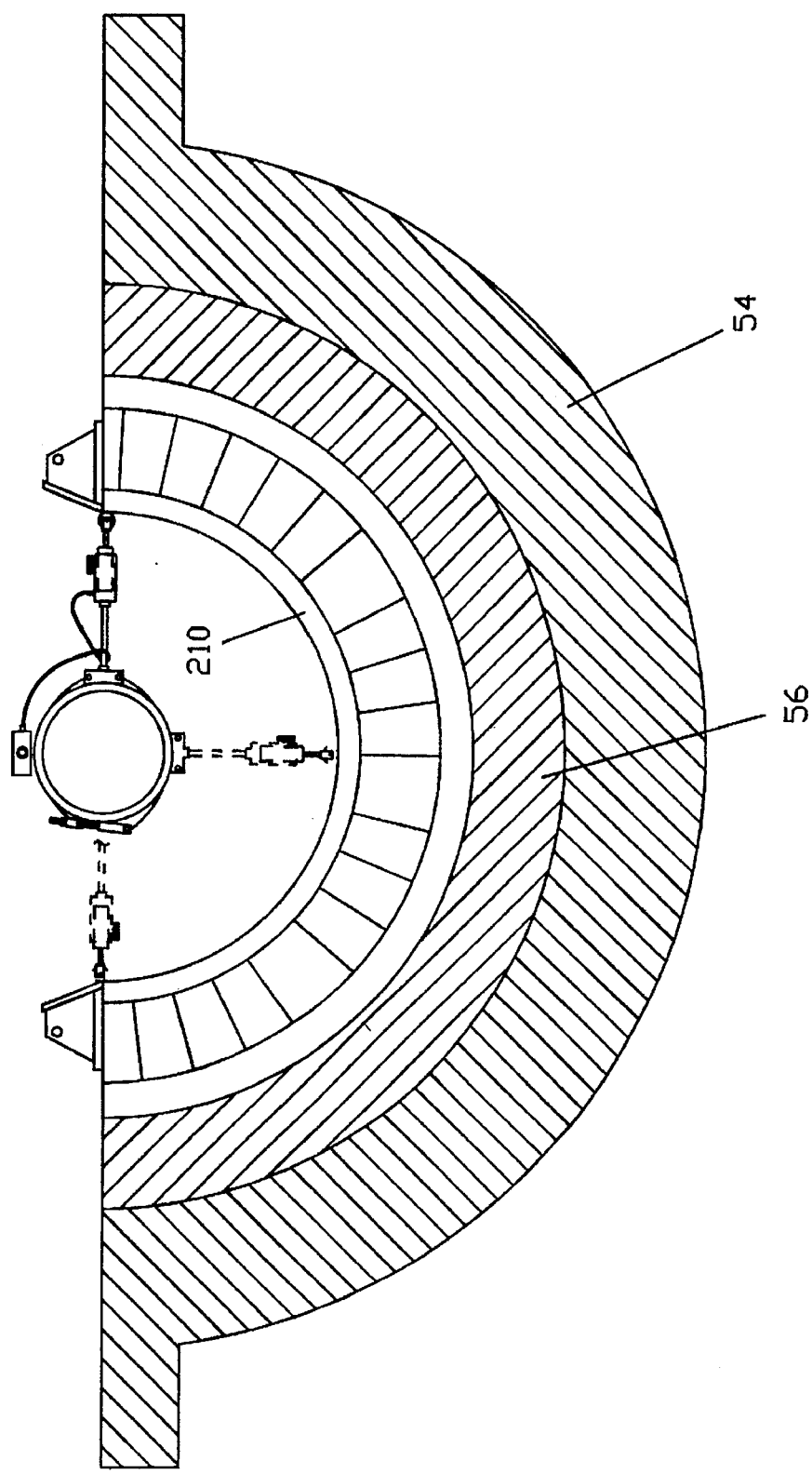
FIG. 18 is a cross section showing data taken in tops off condition.

This data is required to determine the component's position prior to making moves. When the user is ready for tops off readings the user goes to the computer input file developed from the initial turbine component model. Using an appropriate calibration screen such as that shown in FIG. 16, the user confirms each measurement module ID number and either activates or deactivates the module depending upon whether data is required at any specific location. The user then moves to the computer input screen (FIG. 17) and positions tube 102 at the left side (FIG. 18) and records data there, then on the bottom and lastly on the right side. The data at each position is recorded simultaneously for all transducers activated. The user then repeats taking of the above readings to obtain Data Set No. 2 and again to obtain Data Set No. 3. After all data sets are taken the user views the data sets at each bore position as shown in the screen of FIG. 19. If a data set, for example bore number 9/Data Set No. 2, is not repeatable with Data Set Nos. 1 and 3, the user can repeat the taking of Data Set No. 2 and compare the three sets again.

Tops Off/Tops On Data

Figure 20:
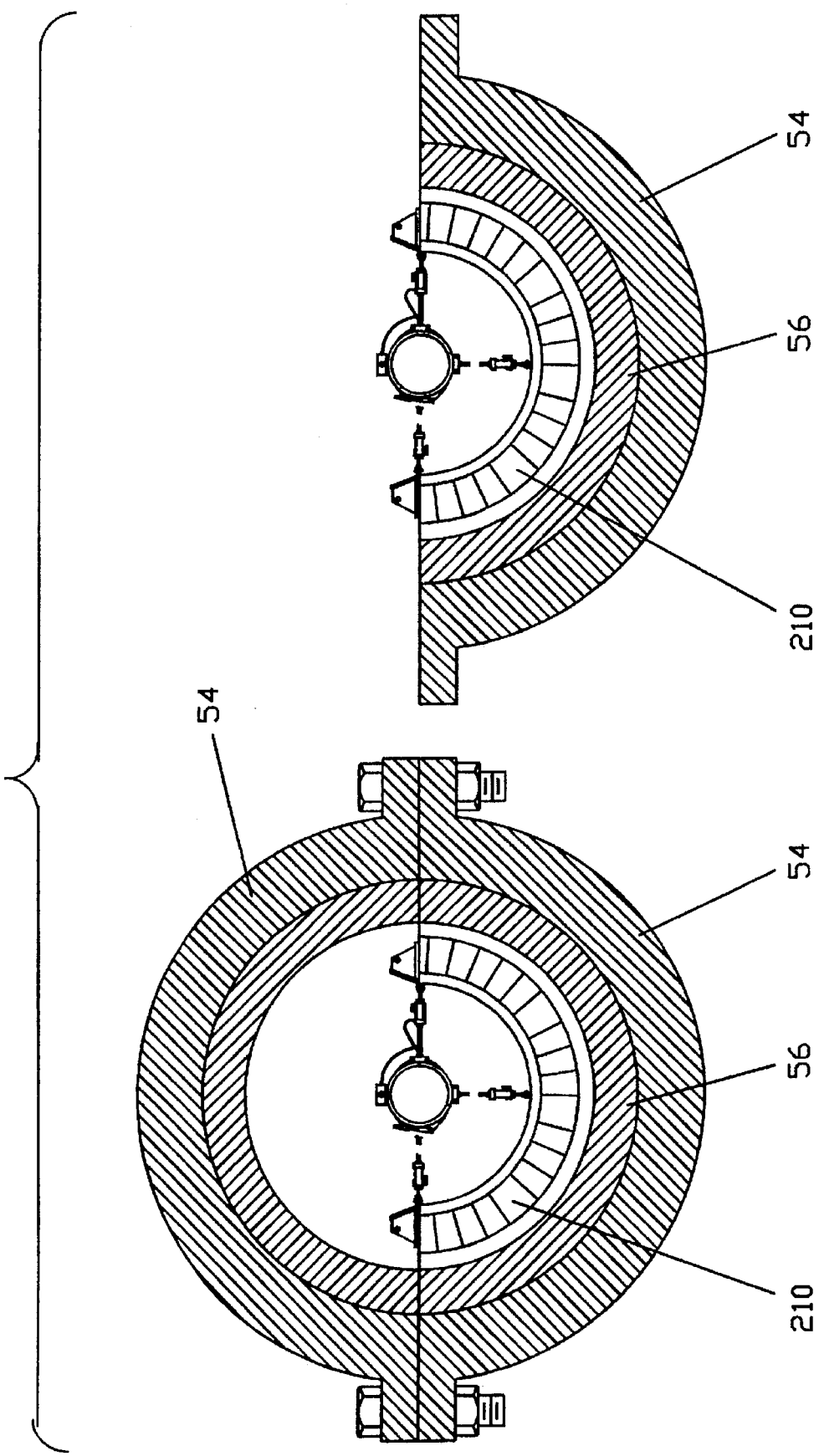
FIG. 20 is a section view showing the taking of data in tops off and tops on condition to obtain "variation."

The Tops Off/Tops On data is required to assess the variation of flowpath components. In order to obtain the vertical and horizontal position change (variation) of the flowpath component due to installation and bolting of the inner and outer shells, one installs the lower half flowpath part and the upper half inner and outer shells as shown in FIG. 20. Calibration checks and data acquisition are taken in a similar manner as previously described for tops off readings except that the computer preferably has separate screens for tops off data and tops on data as shown in FIGS. 21 and 22. It will be appreciated that following the taking of Tops Off/Tops On data the sequence may be reversed (i.e., Tops On/Tops Off) so that the repeatability of the variation may be confirmed.

Ellipticity Data

Figure 23:
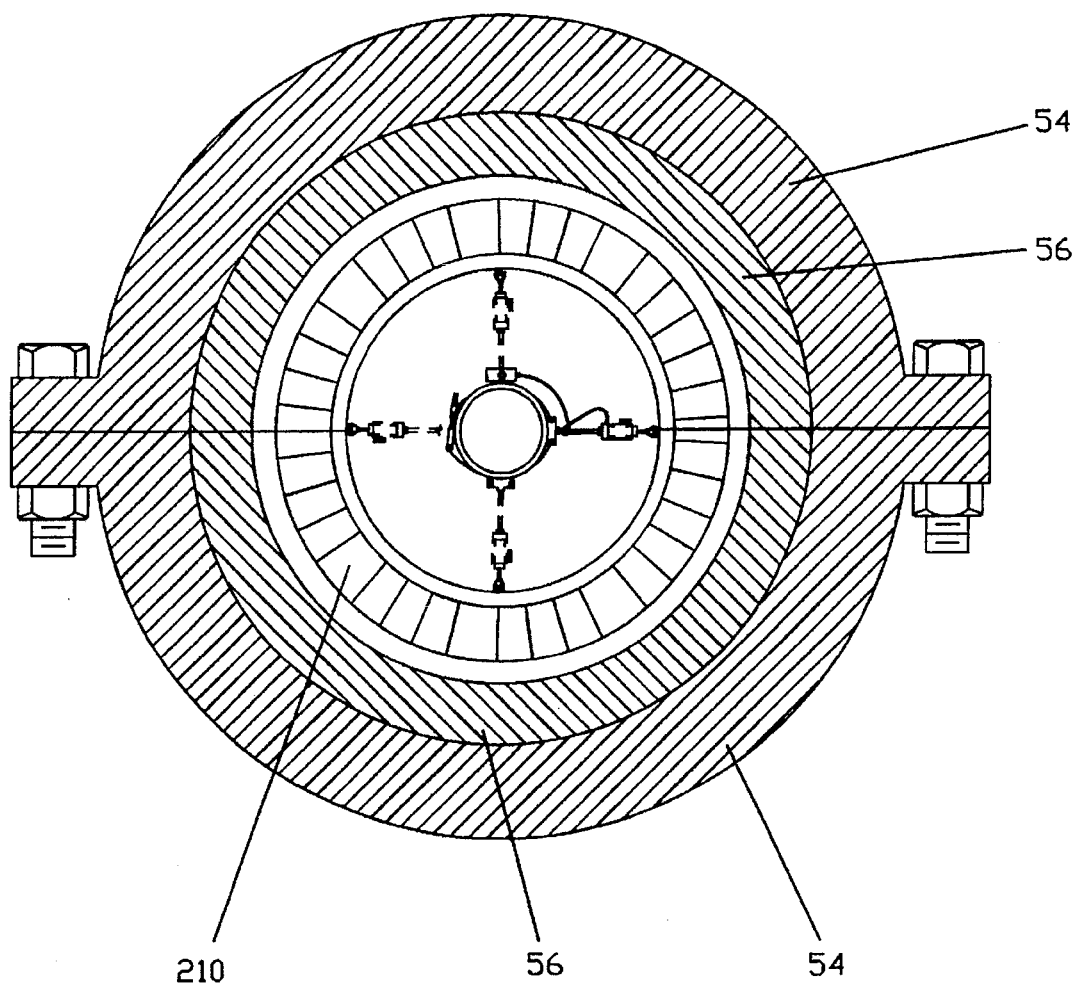
FIG. 23 is a section view showing how ellipticity data is taken.

Ellipticity checks are made in a similar manner as described above except Left, Bottom, Right, and Top readings are taken as shown in FIG. 23 and recorded on input screens as shown in FIG. 24. The readings are important since if the part is elliptical in either a vertical or horizontal direction the position setting of the part must account for this, otherwise the part would be set either too high or too low which could result in a rub at turbine startup.

Joint Offset Data

Figure 25:
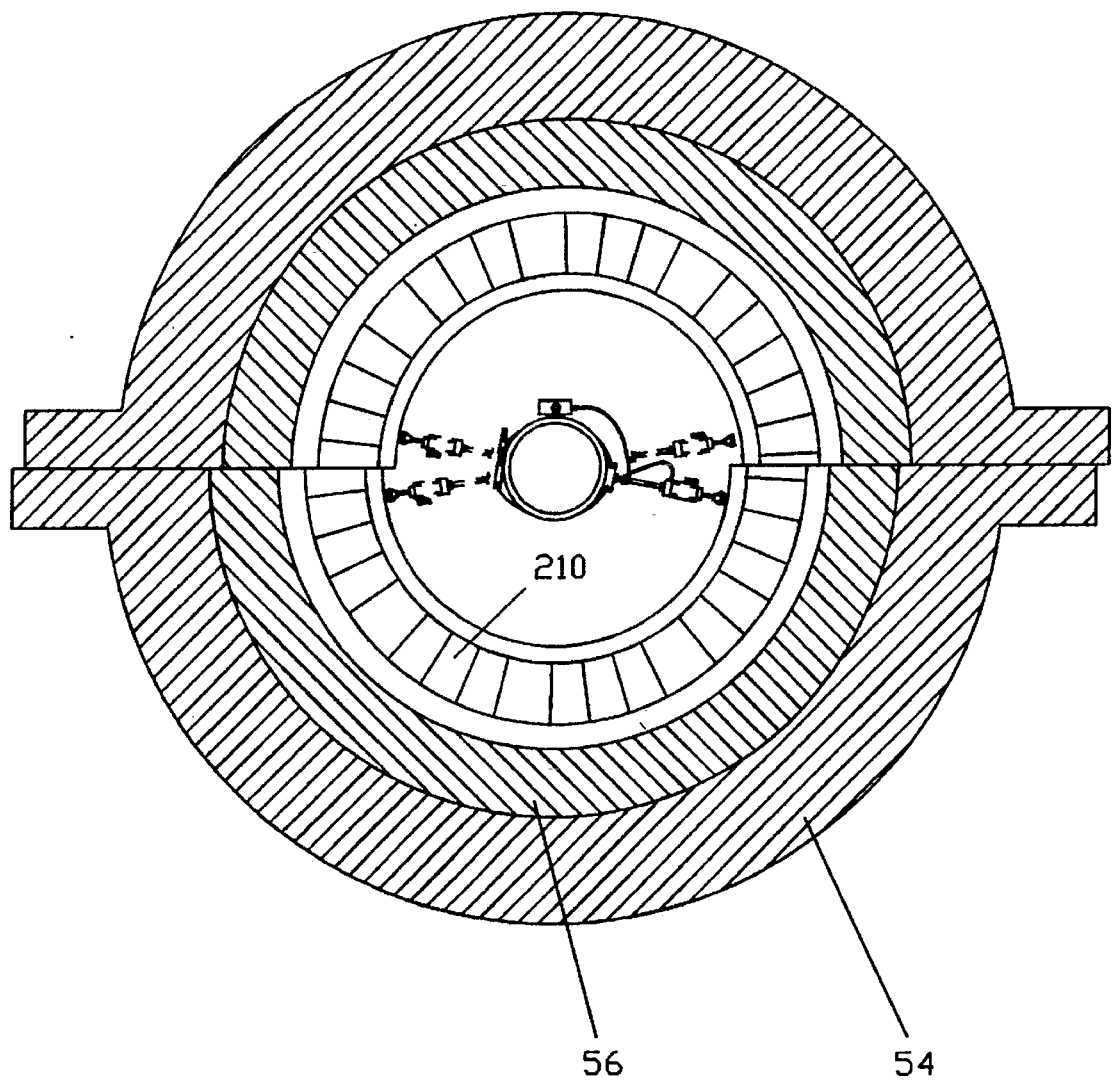
FIG. 25 is a section view showing "Joint Offset" data being taken.

This data is taken similarly to ellipticity data using appropriate computer screens noted previously. Data is taken across the horizontal joints similar to that shown in FIG. 25 and recorded on an input screen as shown in FIG. 26.

Manual Data Inputs

As mentioned previously, two additional inputs are required to determine the required position of the flowpath part: (E) joint opening and (F) rotor sag. Joint opening data is obtained when the top half inner and outer shells are on and bolted and are taken using feeler gages. The feeler gauge data is manually inserted into an input file associated with these measurements as shown in FIG. 27. Rotor sag data at each flowpath part is typically obtained from the turbine manufacturer and is manually inserted into an input file associated with this information as shown in FIG. 28.

Analysis Reports

FIG. 29 is a block diagram of the computer software. As indicated by the diagram, the component moves required to achieve "expected" position depend upon the turbine component model, the automatic data acquisition system inputs (A)–(D) and the manual inputs (E) and (F). Set forth below is a brief description of how each intermediate report is generated and how the reports are combined to output component moves.

1. Intermediate reports for input files tops off, tops off/tops on, and ellipticity are generated by:
   a. taking the automatic data from each measurement module's data set number and converting it to inches by use of a specific equation derived from each module's calibration data.
   b. the three data sets taken at each bore or seal axial location are averaged to obtain an average Left, Bottom, Right, and Top reading in order to improve accuracy. An example is shown on the screen of FIG. 30.
   c. the data is then converted to mils and zero reference corrected using techniques employed by those familiar in the art of turbine alignment as shown on the screen of FIG. 31.
   d. the converted data from (c) above is corrected for tube sag in the bottom and top (if taken) readings. Tube sag is based on model inputs and equations which treat the tube as a uniformly distributed load having multiple point loads randomly distributed along the tube as defined by the input model.
   e. at the turbine and generator end setpoints the "actual" vertical and horizontal position of the tube is compared to the "desired" position. A difference between these two positions results in the tube being mathematically moved and data (Left, Bottom, Right and Top) at each bore or seal location being adjusted accordingly. The adjusted data is then converted to a vertical and horizontal position of the component to the tube as shown on the screen of FIG. 32.
   f. in the "tops off" intermediate report the component's positions to the tube is presented as shown on the screen of FIG. 32, in the tops off/tops on intermediate report the same is presented as shown on the screens of FIG. 33 and FIG. 34, however, a position change between tops on to off is presented along with the position corrections to account for the change in position as shown on the screen of FIG. 35.
   g. in the ellipticity intermediate report steps (a) through (d), above, are applied but the tube is not mathematically moved as the software algorithms need only consider whether the component being measured is elliptical in a vertical or horizontal direction and what position correction need be applied when setting the lower half flowpath component. A typical report is shown in FIG. 36.

2. Intermediate reports for input files "joint opening," "joint offset," and "rotor sag" do not require the same procedures as those described above. The joint opening report shown in FIG. 37 uses the data from its input file to describe a partial position setting since this input only affects the component vertical location. The joint offset report shown in FIG. 38 uses its input data to output a horizontal position location of the flowpath components and the rotor sag report shown in FIG. 39 outputs a vertical position setting of the flowpath components.

3. Using results from reports generated in (1) and (2), immediately above, an "expected" position of the component is determined by the position (vertical and horizontal) corrections from all intermediate reports except the tops off report as shown in FIGS. 40A and 40B. At this point the software requires a knowledgeable alignment specialist to review the computer calculated "expected" position data and apply his judgement based on machine condition and adjust the expected position as appropriate (see FIG. 29). The corrections are input into the input file "expected position" as shown in FIG. 41. Component moves are calculated and presented in the "Moves Required" output report as shown in FIG. 42. The required move at each flowpath location is determined by subtraction of the "actual" position from the "expected" position at a particular bore (or seal) assuming that bore (or seal) is not dependent upon the move of at least two bores (one bore pair). If a particular bore is dependent on the move of other bores as described in the relevant input model, there are algorithms which account for this fact. For example, if a flowpath component sets inside an inner shell and both items require a 10-mil upward move then the flowpath component would not move in this case since it would be dependent on the move of the two bores in the inner shell which moved up 10 mils.

Summary of Certain Features and Advantages of the Invention

1. Permits reading both flowpath component bores' and radial seals' relative position, ellipticity, and joint offset.
2. By use of mechanical supports having X-Y motion, the user can calibrate all transducers simultaneously and with top half shells on or off.
3. Permits measuring very large variation and ellipticity without damaging or exceeding the range of the measuring transducers.
4. Can measure very long axial spans of a turbine section without tube deflection exceeding the linear range of the transducers.
5. Eliminates the need for a large data acquisition device since the apparatus uses a single cable to connect all transducer/module pairs together rather than having a single cable for each transducer. For example, prior art systems have used eddy current probes, typically 20–25 per mandrel, requiring 25 individual cables coming off the end of the mandrel. In preferred embodiments, the present invention has only one cable coming off the end of the mandrel.
6. Data acquisition and analysis are performed by the computer master controller using specially developed software. Typical functions/calculations/analysis performed by the software are:

(a) Obtains calibration data for all transducers simultaneously and from that determines the exact calibration equation for each transducer.

(b) Automatically converts digitized data from each transducer module to inches using the specific transducer calibration equation in (a), immediately above.

(c) The Bottom and Top readings taken by each transducer are corrected automatically for the deflection of the tube at that specific transducer axial location.

(d) The actual transducer data taken at the turbine component setpoint bore on the turbine and generator ends is compared to the design values at those locations. If there is a vertical or horizontal position difference between design and actual, the computer moves the tube mathematically to the design location and automatically corrects the Left, Bottom, Right, and Top readings.

(e) If the user decides he wants to change the design setpoint values and/or turbine and generator bore location, he can do so and the computer will automatically recalculate Left, Bottom, Right, and Top values at each transducer location.

(f) The computer automatically calculates the "expected position" of each component by summing the vertical and horizontal position data from (1) the variation file (2) the ellipticity file (3) the joint offset file (4) the ideal file and (5) the joint opening file.

(g) The computer automatically calculates the vertical and horizontal move each component has to make to get to its "expected position."

7. Encourages or requires the user to take three complete data sets at each axial position so that the data can be viewed for repeatability; if not repeatable, then the user can repeat all or any one of the data sets. After the data is shown to be repeatable, it is then averaged to increase accuracy.

8. Transducers used in the present invention will not have their accuracy affected by material resistivity, flowpath bore target width, or other obstructions in the target area being read that affect the output voltage (thus accuracy) of the transducer.

9. The data is taken by the measurement modules and transferred directly into the computer. In prior art methods, this is done manually with all the attendant possibilities of human error in data transfer and in making calculations.

While the present invention has been described in connection with certain preferred embodiments, it will be appreciated that modifications may be made without departing from the true spirit and scope of the invention.

That which is claimed is:

1. A method for automatically obtaining and analyzing data indicative of the relative position of flowpath component hard bores and seals of a steam or gas turbine section relative to a desired centerline so that proper design clearances may be achieved and to prevent unit rubs and damage that can affect unit operation and performance when the turbine is put into service, said method comprising:

removing the rotor and top half components from the turbine section;

installing an elongate structural member within the turbine section with the axis of the elongate member positioned at approximately the expected centerline of the section, and supporting the elongate member at each end thereof to permit rotation of the elongate member about its axis and to permit precise vertical and horizontal displacement of the elongate member;

installing electronic position transducers at selected axial locations along the elongate member where setpoint hard bores and seals reside on flowpath components, and supporting the transducers for surface-riding engagement with the hard bores and seals;

connecting the transducers to a programmed computer for transmission of data to the computer;

entering turbine model information into the computer, including information for each transducer location;

calibrating the transducers;

taking position data sets at selected hard bore and seal locations via the transducers for at least a plurality of:
 tops off data;
 tops off/tops on data;
 ellipticity data;
 joint offset data;

and transmitting the data sets to the programmed computer;

entering joint opening and rotor sag data into the programmed computer for selected hard bore and seal locations, as desired;

performing analysis utilizing the programmed computer to establish the actual and expected position of the components at each hard bore or seal location; and subtracting the actual position from the expected position at each hard bore or seal location to determine the move required at each location.

2. A method for automatically obtaining and analyzing data indicative of the relative position of flowpath component hard bores and seals of a steam or gas turbine section relative to a desired centerline so that proper design clearances may be achieved and to prevent unit rubs and damage that can affect unit operation and performance when the turbine is put into service, said method comprising:

removing the rotor and top half components from the turbine section;

installing an elongate structural member within the turbine section with the axis of the elongate member positioned at approximately the expected centerline of the section;

installing electronic position transducers at selected axial locations along the elongate member where setpoint hard bores and seals reside on flowpath components, and supporting the transducers for surface-riding engagement with the hard bores and seals;

connecting the transducers to a programmed computer for transmission of data to the computer;

entering turbine model information into the computer, including information for calculating deflection of the elongate member, information defining the axial location of each hard bore or seal and information defining generator end and turbine end setpoints;

providing input data to the computer by use of the transducers at selected hard bore and seal locations, as follows:

(A) taking tops off data to determine actual horizontal and vertical component positions;

(B) taking tops off/tops on data to assess the vertical and horizontal variation of the components;

(C) taking ellipticity data to determine ellipticity of the components;

(D) taking joint offset data across horizontal joints;

providing input data to the computer at selected hard bore and seal locations for:

(E) joint opening;

(F) rotor sag;

calculating the following for selected hard bore and seal locations:
(1) vertical and horizontal position after correcting for tube sag and setpoint position;
(2) vertical and horizontal position due to variation after correcting for tube sag and setpoint position;
(3) vertical position after correcting for measured ellipticity;
(4) horizontal position after correcting for measured joint offset;
summing the calculated information (1)–(4) to generate expected vertical and horizontal position information; and
generating a required move report utilizing the expected position information and actual position information.

3. The method of claim 2 including the step, performed by a knowledgeable alignment specialist prior to generating the required move report, of adjusting the computer calculated expected position information based on subjective factors such as machine condition, knowledge of component design and past operating history.

4. The method of claim 2 including the step of identifying those hard bore and seal locations where the component required move is dependent on the moves of other bores and generating the required moves for said identified hard bore and seal locations to take the dependency into account.

5. The method of claim 2 including the step of making the required moves at the hard bore and seal locations by either roll or non-roll moves.

6. The method of claim 2 including the step of supporting the ends of the elongate member on mechanical supports having the capacity of precisely translating the elongate member in horizontal and vertical directions, and simultaneously calibrating the transducers by moving the elongate member a specified distance for retracted calibration and a specified distance for extended calibration following installation and setup of the system and prior to data inputs (A)–(F).

7. The method of claim 6 including the step of setting the null position near the center of the linear range for each transducer.

8. The method of claim 7 wherein the transducers have a linear range on the order of about 0.80 inch to about 1.00 inch.

9. The method of claim 2 wherein the transducers have a linear range on the order of about 0.80 inch to about 1.00 inch.

10. The method of claim 2 including the step of utilizing transition tabs at selected hard bore and seal locations to prevent transducer damage when the transducer rolls above a horizontal joint and then below the joint.

11. The method of claim 10 wherein the transition tabs take the form of upwardly and outwardly inclined ramp structures at the horizontal joints.

12. The method of claim 2 wherein the readings supplying input data for each of data sets (A), (B), (C) and (D) are generated simultaneously for all activated transducers.

13. The method of claim 2 including the step of automatically correcting bottom and top readings taken by the transducers for deflection of the elongate member at the location of the transducers based on the treatment of the elongate member as a uniformly distributed load having point loads at the transducer locations as defined by the model information.

14. The method of claim 2 including the step of performing "what if" analysis of the alignment problem by changing model input information.

15. The method of claim 2 including the step of installing the transducers in a serial chain forming a multi-drop serial application.

16. An apparatus for automatically obtaining and analyzing data indicative of the relative position of flowpath component hard bores and seals of a steam or gas turbine section relative to a desired centerline so that proper design clearances may be achieved and to prevent unit rubs and damage that can affect unit operation and performance when the turbine is put into service, said apparatus comprising:
a rotatable elongate structural member located within the turbine section with the axis of the elongate member at approximately the expected centerline of the turbine section;
first and second mechanical supports for supporting the respective ends of said elongate member, said mechanical supports permitting rotation of said elongate member about its axis and permitting precise vertical and horizontal displacement of the elongate member;
a plurality of electronic position transducers installed at selected axial locations along said elongate member where setpoint hard bores and seals reside on flowpath components, each transducer having a radially projecting surface-riding portion for contacting the cylindrical flowpath component hard bore or seal located at its respective axial location;
said transducers having a linear range determined by the sum of expected component ellipticity, variation, misalignment and tube sag;
an adjustable support for supporting and positioning each transducer to hold the transducer surface-riding portion in engagement with the cylindrical flowpath component at its respective axial location;
a programmed computer; and
a multi-drop serial connection among the respective transducers for facilitating transmission of data to said programmed computer.

17. The apparatus of claim 16 having primary usage in connection with a large utility or industrial turbine and wherein the linear range of the transducers is greater than about 0.80 inch.

18. The apparatus of claim 17 wherein the linear range of the transducers is from about 0.80 inch to about 1.00 inch.

19. The apparatus of claim 16 wherein each transducer has associated interface electronics, with each transducer and its associated interface electronics together defining a measurement module, and wherein the measurement modules are connected together using a multi-drop serial communications system.

20. The apparatus of claim 19 including an interface module serving as a serial communications link between the computer and the interface electronics of the measurement modules and converting the serial communications signals to electrical levels readable by said programmed computer.

21. The apparatus of claim 20 wherein the interface electronics of each measurement module includes means for (1) supplying excitation to the transducer, (2) reading the transducer output signal, (3) preprocessing the transducer output signal, (4) digitizing the output signal and (5) communicating the digitized signal value to the computer through the interface module.

22. An apparatus for automatically obtaining and analyzing data indicative of the relative position of flowpath component hard bores and seals of a steam or gas turbine section relative to a desired centerline so that proper design clearances may be achieved and to prevent unit rubs and damage that can affect unit operation and performance when the turbine is put into service, said apparatus comprising:

a rotatable elongate structural member located within the turbine section with the axis of the elongate member at approximately the expected centerline of the turbine section;

first and second mechanical supports for supporting the respective ends of said elongate member, said mechanical supports permitting rotation of said elongate member about its axis and permitting precise vertical and horizontal displacement of the elongate member;

a plurality of position transducers installed at selected axial locations along said elongate member where setpoint hard bores and seals reside on flowpath components, each transducer having a radially projecting surface-riding portion for contacting the cylindrical flowpath component hard bore or seal located at its respective axial location;

a support for supporting and positioning each transducer to hold the transducer surface-riding portion in engagement with the cylindrical flowpath component at its respective axial location;

means, including said first and second mechanical supports, permitting movement of said rotatable structural member, said transducers and turbine components as necessary to take tops off data, tops off/tops on data, ellipticity data and joint offset data;

a programmed computer;

connections between the respective transducers and the programmed computer for transmission of data; and means associated with said programmed computer for storing turbine model information, tops off input data, tops off/tops on input data, ellipticity input data and joint offset input data, and for generating a move report for each said hard bore and seal location utilizing the mentioned stored information and data.

23. The apparatus of claim 22 wherein said means associated with said programmed computer includes means for generating intermediate output reports for each said hard bore and seal location and means for summing the outputs from the intermediate reports to produce vertical and horizontal position values for each location.

24. The apparatus of claim 22 wherein said means associated with said programmed computer additionally stores joint opening information, rotor sag information and expected position information.

25. The apparatus of claim 24 wherein said means associated with said programmed computer for generating a move report includes means for subtracting actual position at each location from expected position to generate the move report.

* * * * *